US012610273B2

(12) United States Patent
Wang

(10) Patent No.: US 12,610,273 B2
(45) Date of Patent: Apr. 21, 2026

(54) METHOD AND DEVICE FOR VIDEO TRANSMISSION, AND STORAGE MEDIUM

(71) Applicant: DATANG MOBILE COMMUNICATIONS EQUIPMENT CO., LTD., Beijing (CN)

(72) Inventor: Hucheng Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 330 days.

(21) Appl. No.: 18/263,559

(22) PCT Filed: Jan. 11, 2022

(86) PCT No.: PCT/CN2022/071453
§ 371 (c)(1),
(2) Date: Jul. 31, 2023

(87) PCT Pub. No.: WO2022/161162
PCT Pub. Date: Aug. 4, 2022

(65) Prior Publication Data
US 2024/0089209 A1      Mar. 14, 2024

(30) Foreign Application Priority Data
Feb. 1, 2021      (CN) .......................... 202110138111.9

(51) Int. Cl.
*H04L 47/2408*      (2022.01)
*H04L 47/2416*      (2022.01)
*H04W 28/02*      (2009.01)

(52) U.S. Cl.
CPC ..... *H04W 28/0268* (2013.01); *H04L 47/2408* (2013.01); *H04L 47/2416* (2013.01)

(58) Field of Classification Search
CPC ........... H04L 47/2408; H04L 47/2416; H04W 28/0268
See application file for complete search history.

(56) References Cited

U.S. PATENT DOCUMENTS

| 2002/0054578 | A1 | 5/2002 | Zhang et al. |
| 2023/0050923 | A1* | 2/2023 | Li ........................... H04L 65/70 |
| 2023/0362127 | A1* | 11/2023 | Korja .................. H04L 61/4511 |

FOREIGN PATENT DOCUMENTS

| CN | 101184222 A | 5/2008 |
| CN | 101420461 A | 4/2009 |

(Continued)

OTHER PUBLICATIONS

Notice of the First Review Opinion issued Feb. 24, 2023 in Chinese Application No. 202110138111.9.

(Continued)

*Primary Examiner* — Kevin C. Harper
(74) *Attorney, Agent, or Firm* — Harness, Dickey & Pierce, P.L.C.

(57) ABSTRACT

A method and device for video transmission are disclosed. A session management function (SMF) receives a policy and charging control (PCC) rule sent by a policy control function (PCF). The PCC rule is generated by the PCF in response to determining that a transmission of a first video frame needs to be guaranteed. The PCC rule indicates that a quality of service (QoS) flow transmission with a first QoS guarantee is used for a first service flow. The first service flow includes a first video frame.

18 Claims, 6 Drawing Sheets

(56)                    References Cited

FOREIGN PATENT DOCUMENTS

| CN | 109417534 A | 3/2019 | |
|----|----|----|----|
| CN | 109600664 A | 4/2019 | |
| CN | 109982266 A | 7/2019 | |
| CN | 2020103228138 * | 1/2021 | |
| EP | 3445059 A1 | 2/2019 | |
| WO | WO-2017/190329 A1 | 11/2017 | |
| WO | 2019/062783 A1 | 4/2019 | |
| WO | WO-2021213000 A1 * | 10/2021 | ............ H04W 28/24 |

OTHER PUBLICATIONS

International Search Report and Written Opinion issued Apr. 6, 2022 in International Application No. PCT/CN2022/071453.
Extended European Search Report Issued Apr. 16, 2024 in European application 22745040.0.
"3rd Generation Partnership Project;Technical Specification Group Services and System Aspects;Procedures for the 5G System (5GS);Stage 2(Release 16)", 3GPP TS23.502, Jan. 13, 2021.
"3rd Generation Partnership Project;Technical Specification Group Services and System Aspects;Policy and charging control framework for the5G System (5GS);Stage 2(Release 16)", 3GPP TS 23.503, Sep. 24, 2020.

* cited by examiner receiving a policy and charging control (PCC) rule sent by a policy control function (PCF), in which the PCC rule is generated by the PCF in response to determining that a transmission of a first video frame needs to be guaranteed, the PCC rule indicates that a (QoS) flow transmission with a first QoS guarantee is used for a first service flow, and the first service flow includes a first video frame

001

FIG. 1 receiving a policy and charging control (PCC) rule sent by a policy control function (PCF), in which the PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame; and that a QoS flow transmission with a second QoS guarantee is used for a second service flow, the second service flow includes a second video frame, and the first QoS guarantee is higher than the second QoS guarantee

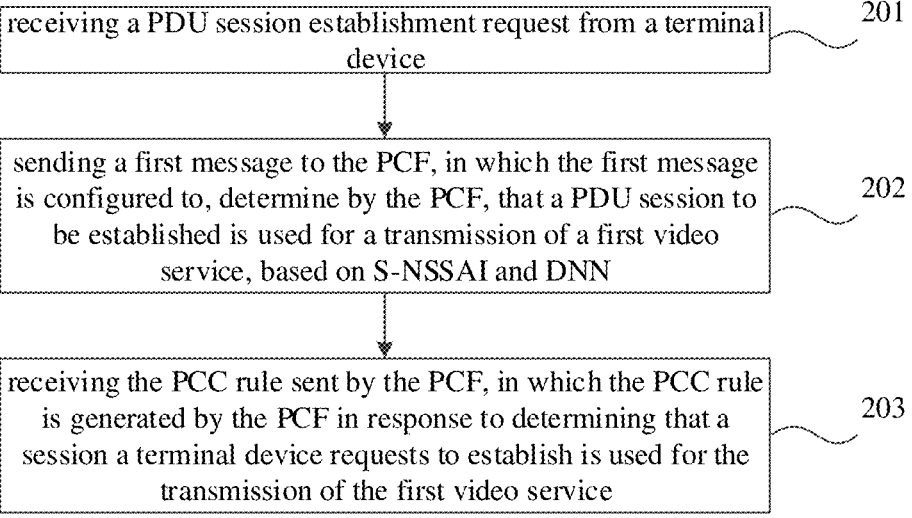

receiving a PDU session establishment request from a terminal device

201 sending a first message to the PCF, in which the first message is configured to, determine by the PCF, that a PDU session to be established is used for a transmission of a first video service, based on S-NSSAI and DNN

202 receiving the PCC rule sent by the PCF, in which the PCC rule is generated by the PCF in response to determining that a session a terminal device requests to establish is used for the transmission of the first video service

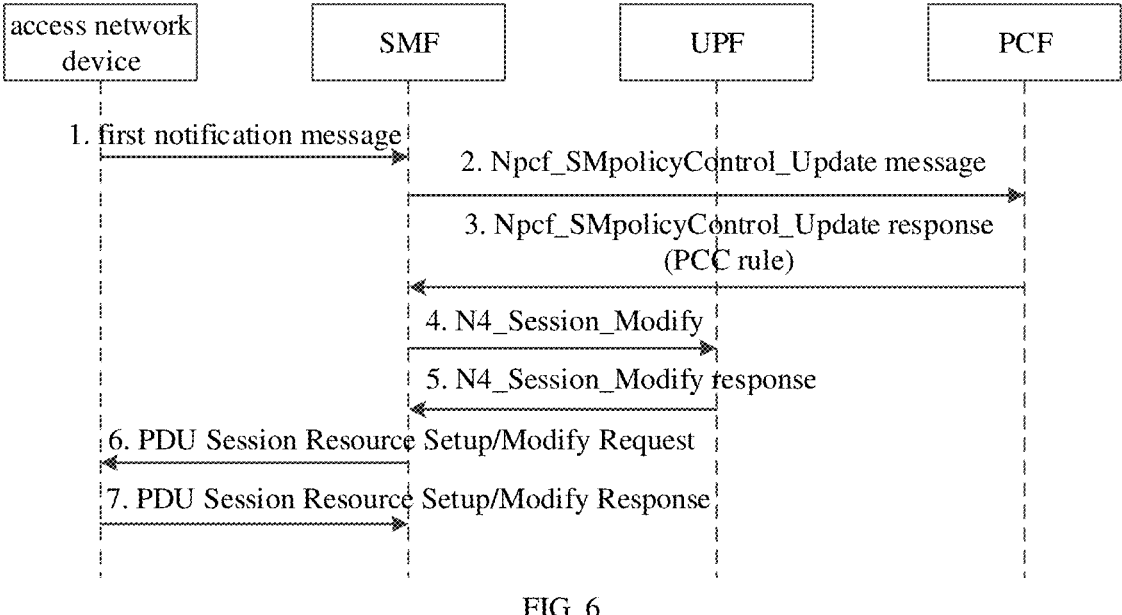

1. first notification message

2. Npcf_SMpolicyControl_Update message

3. Npcf_SMpolicyControl_Update response (PCC rule)

4. N4_Session_Modify

5. N4_Session_Modify response

6. PDU Session Resource Setup/Modify Request

7. PDU Session Resource Setup/Modify Response

FIG. 6

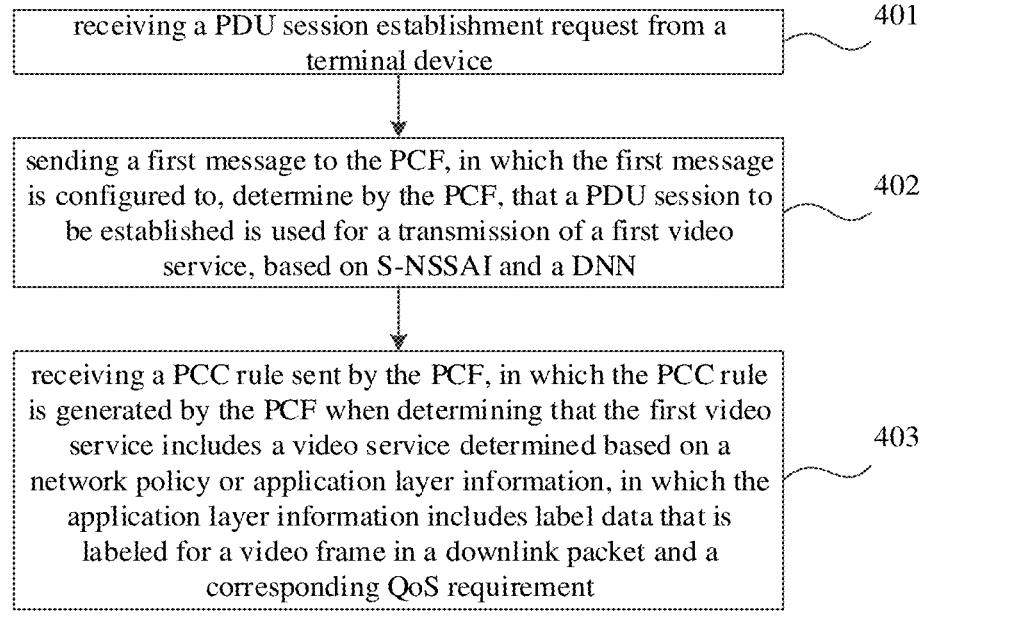

receiving a PDU session establishment request from a terminal device — 401 sending a first message to the PCF, in which the first message is configured to, determine by the PCF, that a PDU session to be established is used for a transmission of a first video service, based on S-NSSAI and a DNN — 402 receiving a PCC rule sent by the PCF, in which the PCC rule is generated by the PCF when determining that the first video service includes a video service determined based on a network policy or application layer information, in which the application layer information includes label data that is labeled for a video frame in a downlink packet and a corresponding QoS requirement — 403

FIG. 7 generating a PCC rule and sending the PCC rule to the SMF in response to determining that the transmission of the first video service needs to be guaranteed; the PCC rule indicates that a QoS flow transmission with a first QoS guarantee is used for a first service flow, and the first service flow includes a first video frame    601
FIG. 11
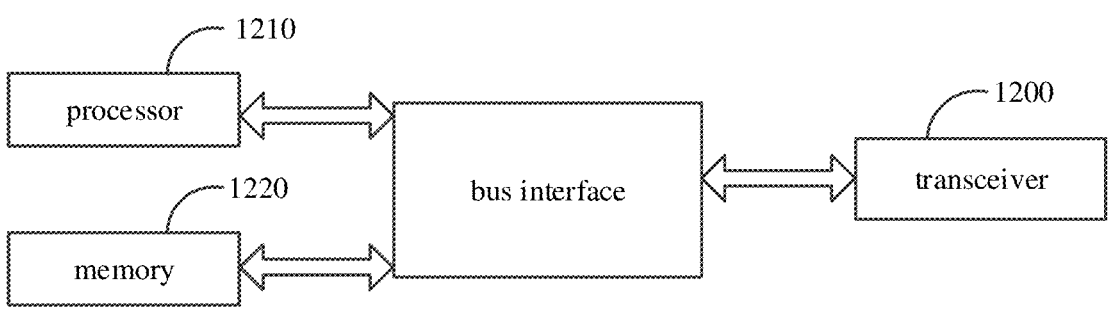
FIG. 12
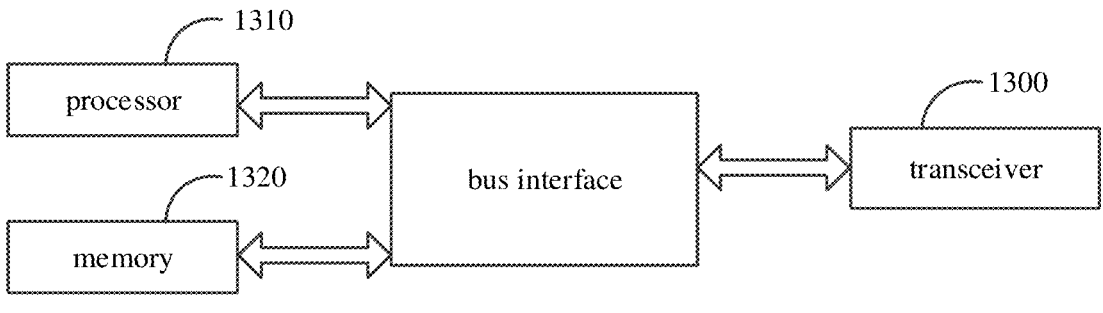
FIG. 13

1400

1500

METHOD AND DEVICE FOR VIDEO TRANSMISSION, AND STORAGE MEDIUM

CROSS-REFERENCE TO RELATED APPLICATIONS

This application is the US national phase application of International Application No. PCT/CN2022/071453, filed on Jan. 11, 2022, which claims priority to Chinese Patent Application No. 202110138111.9, filed on Feb. 1, 2021, the entire contents of each of which are incorporated herein by reference for all purposes.

TECHNICAL FIELD

The present disclosure relates to a field of wireless communication technologies, and particularly to a method and a device for video transmission, and a storage medium.

BACKGROUND

In order to save a storage space, various compression algorithms may be adopted to compress a video, and all coded frames in a compressed video are transmitted in a same quality of service (QoS) flow. However, all coded frames in the compressed video flow are transmitted by adopting a same QoS flow, which may not ensure a reliable and on-time transmission of a key frame. In a decoding process of the compressed video, if the key frame is lost, a set of pictures are unable to be decoded, and if the key frame does not arrive on time, a set of video pictures are delayed, thereby seriously reducing the user experience.

SUMMARY

According to an aspect of the present disclosure, a method for video transmission is provided. The method is applicable to a session management function (SMF), and includes:

receiving a policy and charging control (PCC) rule sent by a policy control function (PCF), in which the PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame.

According to another aspect of the present disclosure, another method for video transmission is provided. The method is applicable to a policy control function (PCF), and includes:

in response to determining that a transmission of a first video frame needs to be guaranteed, generating a policy and charging control (PCC) rule, and sending the PCC rule to a session management function (SMF);

in which the PCC rule indicates that a quality of service (QoS) flow transmission with a first QoS guarantee is used for a first service flow, and the first service flow includes a first video frame.

According to another aspect of the present disclosure, a session management function (SMF) is provided. The SMF includes:

a memory configured to store a computer program, a transceiver configured to transmit and receive data under a control of a processor, and the processor configured to read the computer program in the memory and perform an operation of:

receiving a policy and charging control (PCC) rule sent by a policy control function (PCF), in which the PCC rule is generated by the PCF in response to determining that a transmission of a first video frame needs to be guaranteed, the PCC rule indicates that a quality of service (QoS) flow transmission with a first QoS guarantee is used for a first service flow, and the first service flow includes a first video frame.

According to another aspect of the present disclosure, a policy control function (PCF) is provided. The PCF includes:

a memory configured to store a computer program, a transceiver configured to transmit and receive data under a control of a processor, and the processor configured to read the computer program in the memory and perform an operation of:

in response to determining that a transmission of a first video frame needs to be guaranteed, generating a policy and charging control (PCC) rule, and sending the PCC rule to a session management function (SMF);

in which the PCC rule indicates that a quality of service (QoS) flow transmission with a first QoS guarantee is used for a first service flow, and the first service flow includes a first video frame.

PCC rule indicates that a quality of service (QoS) flow transmission with a first QoS guarantee is used for a first service flow According to another aspect of the present disclosure, a non-transitory processor-readable storage medium with a computer program stored thereon is provided, in which the computer program is configured to cause a processor to perform the method for video transmission as described in one aspect of the present disclosure.

According to another aspect of the present disclosure, a non-transitory processor-readable storage medium with a computer program stored thereon is provided, in which the computer program is configured to cause a processor to perform the method for video transmission as described in another aspect of the present disclosure.

BRIEF DESCRIPTION OF THE DRAWINGS

FIG. 1 is a flowchart illustrating a method for video transmission provided in a first embodiment of the present disclosure;

FIG. 2 is a flowchart illustrating a method for video transmission provided in a second embodiment of the present disclosure;

FIG. 3 is a flowchart illustrating a method for video transmission provided in a third embodiment of the present disclosure;

FIG. 6 is a flowchart illustrating enabling a first video frame guarantee transmission when a QoS of a first video service transmission is incapable of being guaranteed in embodiments of the present disclosure;

FIG. 7 is a flowchart illustrating a method for video transmission provided in a fifth embodiment of the present disclosure;

FIG. 11 is a flowchart illustrating a method for video transmission provided in a seventh embodiment of the present disclosure;

FIG. 12 is a diagram illustrating a structure of a session management function (SMF) provided in an eighth embodiment of the present disclosure;

FIG. 13 is a diagram illustrating a structure of a policy control function (PCF) provided in a ninth embodiment of the present disclosure;

DETAILED DESCRIPTION

Figure 4:
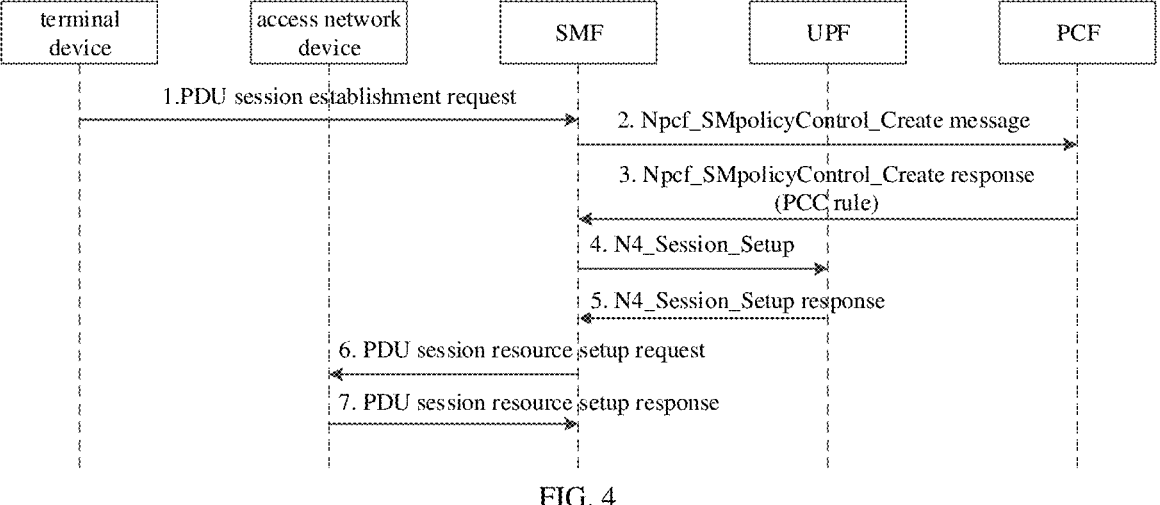
FIG. 4 is a flowchart illustrating indicating and distinguish a first video frame through a protocol data unit (PDU) session establishment process in embodiments of the present disclosure.

In embodiments of the present disclosure, the term "and/or", describes the relationship of the association objects, indicating that there may exist three relationships, for example, A and/or B, may represent: any of existing A only, existing both A and B, or existing B only. The character "/" generally means the contextual object is a kind of "or" relationship.

In embodiments of the present disclosure, the term "a plurality of" means two or above, which is similar to other quantifiers.

The technical scheme in embodiments of the present disclosure will be described clearly and completely in combination with the appended drawings in embodiments present the present disclosure. It is obvious that the embodiments described are only part of embodiments in the present disclosure, rather than all embodiments. On the basis of embodiments of the present disclosure, all other embodiments obtained by those skilled in the art without creative work are within the protection scope of the present disclosure.

Before embodiments of the present disclosure are described, for convenience of understanding, common technical terms are introduced:

1. Video Frame

When a video is decoded, each video frame represents a static image. When the video is actually compressed, in order to save a storage space, a variety of compression algorithms are often adopted to reduce a capacity of video data. I, P, B frames are most common video frames.

The I-frame is an intra-frame coded frame, also known an intra picture. The I-frame is a first frame of each group of pictures (GOP) that is moderately compressed as a reference point for random access. The I-frame may be considered as a product of an image that has been compressed. The I-frame is kept intact and may be decoded independently without reference to other images (since the I-frame includes a complete picture).

The P-frame is a forward predictive coded frame, also known as a predictive-frame. The P-frame is a coded image that transmits a data volume by fully compressing temporal redundancy information of previous coded frames in an image sequence, also known as a predictive frame. The P-frame represents a difference between a current frame and a previous frame (the previous frame may be the key frame I-frame, or the P frame). When decoding, a previously cached picture needs to be superimposed with a difference defined in the current frame to generate a final picture. (i.e. a difference frame, the P-frame has no complete picture data, and only has data on picture difference from the previous frame). Compared to the I-frame, the P-frame usually occupies fewer data bits, but its defect is that it is very sensitive to transmission errors due to its complex dependency on the preceding P and I frames.

The B-frame, a bi-directional difference frame, means that the B-frame records a difference between the current frame and the previous and latter frames. In other words, to decode the B-frame, not only a previous cached picture is obtained, but also a decoded picture is obtained, and the previous cached picture and the decoded picture are superimposed with the current frame of data to generate a final picture. The B-frame has a high compression rate, but requires a high decoding performance.

In summary, decoding algorithms of the I-frame and the P-frame are relatively simple and resource occupations are fewer. The I-frame only needs to be decoded independently based on the current frame of data, while the P-frame only needs a decoder to cache the previous frame of picture and use the previously cached picture when encountering the P-frame. When a video stream only has the I-frame and the P-frame, the decoder may decode while reading and advance linearly. When the video stream still has the B frame, the previous video frame and the current video frame need to be cached, and then decoded when a latter video frame is obtained.

Different video coding formats have different methods for determining a frame type. In a moving pictures experts group (MPEG) series of standards, for MPEG4 videos, a method for determining the I-frame, the P-frame and the B-frame is that: each frame of MPEG4 starts with a fixed 00 00 01 b6 format, and the following 2 bits respectively represent different types of video frames. When 2 bits are 00, the represented type is the I-frame, and when 2 bits are 01, the represented type is the P-frame, and when 2 bits are 10, the represented type is the B-frame.

A codec standard H.264 of video stream transmission transmits a network abstraction layer unit (NALU) on a network, and a structure of the NALU is: a network abstraction layer (NAL) header (i.e. a NAL header)+a raw byte sequence payload (RBSP), and a data flow in actual transmission may be illustrated in Table 1.

TABLE 1

| . . . | NAL header | RBSP | NAL header | RBSP | NAL header | RBSP | . . . |
|---|---|---|---|---|---|---|---|

The NAL header occupies one byte, and its 5th byte represents a NAL type, in which when the NAL type is 5, the current frame is the I-frame, that is, a key frame, and when the NAL type is 1, the current frame is a non-key frame (the P-frame or the B-frame).

2. QoS Flow Mapping

The SMF may bind a service data flow to a suitable QoS flow based on the QoS and service requirements of the service data flow, and allocate a QoS flow identifier (QFI) to a newly created QoS flow, and generate a QoS profile, a UPF command and a QoS rule based on the PCC rule and other information provided by the PCF.

The SMF sends a downlink PDR including a downlink portion of a service data flow template to the UPF, and the UPF classifies a user-plane traffic based on information sent by the SMF; the SMF may further send QoS-related information corresponding to the PDR to the UPF, so that the UPF may label a data packet classified based on PDR and perform Qos control on it.

In an embodiment of the present disclosure, the PDR is a set of packet filters that may include at least one of: a source IP address or a destination IP address or an Internet Protocol Version 6 (IPv6) prefix; a source port number or a destination port number; a protocol ID above an IP or a next header type; a ToS (an Internet Protocol Version 4 (IPv4))/service level (IPv6) and masking; a flow label (IPv6); a security parameter index; or a packet filter direction.

In the related art, the key frame is not distinguished in the method for mapping the QoS flow. Therefore, a higher QoS guarantee can not be provided for the transmission of the key frame, i.e., reliability and certainty of the transmission of the key frame can not be guaranteed, and especially when network resources are limited or congested, the reliable and on-time transmission of the key frame may not be guaranteed, which may reduce the user experience.

Therefore, a method and an apparatus for video transmission are provided in embodiments of the present disclosure, to distinguish the first video frame in the service flow, for example, a key frame, which provides a high QoS guarantee for the transmission of the first video frame, to ensure the reliable and on-time transmission of the first video frame, thereby avoiding that the second video frame is unable to be decoded due to a loss or a delay arrival of the first video frame, for example, avoiding that the P-frame and the B-frame are unable to be decoded due to a loss or a delay arrival of the I-frame, which improves the user experience.

Since principles of the method are similar with those of the apparatus, the implementation of the apparatus and the method may be referred to each other, which is not repeated here.

The method for video transmission provided in embodiments of the present disclosure is applicable to the SMF. A policy and charging control (PCC) rule sent by a policy control function (PCF) is received by the SMF. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame. Thus, a transmission for a first video frame can be achieved, and a QoS flow with a suitable QoS guarantee can be provided, to ensure a reliable and on-time transmission of the first video frame.

The method and the apparatus for video transmission, and the storage medium provided in the present disclosure are described referring to attached drawings.

FIG. 1 is a flowchart illustrating a method for video transmission provided in a first embodiment of the present disclosure.

An executive body of embodiments of the present disclosure is an apparatus for video transmission provided in the disclosure, and the apparatus for video transmission may be configured in a session management function (SMF).

As illustrated in FIG. 1, the method for video transmission is applicable to the SMF. The method may include the following steps.

At step 001, a policy and charging control (PCC) rule sent by a policy control function (PCF) is received. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame.

In embodiments of the present disclosure, the service flow may be a service flow corresponding to a video service. In order to facilitate distinguishing different service flows, in the present disclosure, the service flow including a first video frame may be referred to as a first service flow, and the first video frame may be, for example, a key frame, that is, an I-frame.

In embodiments of the present disclosure, the first QoS guarantee may be a relatively high QoS guarantee, for example, the first QoS guarantee may be a GBR QoS guarantee.

In embodiments of the present disclosure, the PCF may generate a PCC rule and send the PCC rule to the SMF in response to determining that a transmission of a first video frame needs to be guaranteed, and correspondingly, the SMF may receive the PCC rule sent by the PCF. The PCC rule indicates that a QoS flow transmission with a first QoS guarantee is used for a first service flow, and the first service flow includes a first video frame. Thus, the first video frame, for example, a key frame, in the service flow may be distinguished, which provides a high QoS guarantee for the transmission of the first video frame, to ensure a reliable and on-time transmission of the first video frame, thereby avoiding that other video frames are unable to be decoded due to a loss or a delay arrival of the first video frame, for example, avoiding that the P-frame and/or the B-frame is unable to be decoded due to a loss or a delay arrival of the I-frame, which improves the user experience.

In the method for video transmission in embodiments of the present disclosure, a policy and charging control (PCC) rule sent by a policy control function (PCF) is received by the SMF. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame. Thus, a transmission for the first video frame can be achieved, and a QoS flow with a specific applicable QoS guarantee can be provided, to ensure a reliable and on-time transmission of the first video frame.

In a possible implementation of embodiments of the present disclosure, the PCC rule may further indicate that a QoS flow transmission with a second QoS guarantee is used for a second service flow. The second service flow includes a second video frame, and the first QoS guarantee is higher than the second QoS guarantee. Thus, the high QoS guarantee may be provided for the transmission of the first video frame, which ensures a reliable and on-time transmission of the first video frame.

The above process is described below in combination with the second embodiment.

FIG. 2 is a flowchart illustrating a method for video transmission in a second embodiment of the present disclosure.

As illustrated in FIG. 2, the method for video transmission is applicable to an SMF. The method may include the following steps.

At step 101, a policy and charging control (PCC) rule sent by a policy control function (PCF) is received. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame; and a QoS flow transmission with a second QoS guarantee is used for a second service flow, the second service flow includes a second video frame, and the first QoS guarantee is higher than the second QoS guarantee.

In embodiments of the present disclosure, the service flow may be a service flow corresponding to a video service. In order to facilitate distinguishing different service flows, in the present disclosure, the service flow including a first video frame may be referred to as a first service flow, and the first video frame may be, for example, a key frame, that is, an I-frame.

In embodiments of the present disclosure, a service flow including a second video frame may be referred to as a second service flow, and the second video frame may be, for example, a non-key frame, that is, a P-frame and/or a B-frame.

In embodiments of the present disclosure, the first QoS guarantee is higher than the second QoS guarantee, and for example, the first QoS guarantee may be a high QoS guarantee, and the second QoS guarantee may be a common QoS guarantee. As an example, the first QoS guarantee may be a GBR QoS, and the second QoS guarantee may be a non-GBR QoS or a low GBR QoS.

In embodiments of the present disclosure, when the PCF determines that a transmission of a first video frame needs to be guaranteed, the PCF may generate a PCC rule, and send the PCC rule to the SMF, and correspondingly, the SMF may receive the PCC rule sent by the PCF. The PCC rule indicates that a QoS flow transmission with a first QoS guarantee is used for a first service flow, and the first service flow includes a first video frame; and/or, the PCC rule further indicates that a QoS flow transmission with a second QoS guarantee is used for a second service flow, the second service flow includes a second video frame, and the first QoS guarantee is higher than the second QoS guarantee. Thus, the first video frame in the service flow, such as a key frame, may be distinguished, to provide a high QoS guarantee for the transmission of the first video frame, so as to ensure a reliable and on-time transmission of the first video frame, thereby avoiding that the second video frame is unable to be decoded due to a loss or a delay arrival of the first video frame, for example, avoiding that the P-frame and/or the B-frame is unable to be decoded due to a loss or a delay arrival of the I-frame, which improves the user experience.

In the method for video transmission in embodiments of the present disclosure, a policy and charging control (PCC) rule sent by a policy control function (PCF) is received by the SMF. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame; and/or to a QoS flow transmission with a second QoS guarantee is used for a second service flow, the second service flow includes a second video frame, and the first QoS guarantee is higher than the second QoS guarantee. Thus, a high QoS guarantee may be provided for the transmission of the first video frame, which ensures a reliable and on-time transmission of the first video frame.

In a possible implementation of embodiments of the present disclosure, the specific process of determining by the PCF that the transmission of the first video frame needs to be guaranteed may be: the PCF determines that the transmission of the first video frame needs to be guaranteed in response to determining that a session a terminal device requests to establish is used for the transmission of the first video service. The above process is described below in combination with the third embodiment.

FIG. 3 is a flowchart illustrating a method for video transmission provided in a third embodiment of the present disclosure.

As illustrated in FIG. 3, the method for video transmission is applicable to an SMF. The method may include the following steps.

At step 201, a PDU session establishment request sent from a terminal device is received.

In embodiments of the present disclosure, the terminal device may refer to a device that provides voice and/or data connectivity to a user, a handheld device with a wireless connection function, or other processing devices connected to a radio modem. In different systems, the name of the terminal device may be different. For example in a 5G system, the terminal device may be referred to a user equipment (UE). The wireless terminal device may communicate with one or more core networks (CN) via a radio access network (RAN). The wireless terminal device may be a mobile terminal device, for example, a mobile phone (or referred to as a cellular phone), and a computer having a mobile terminal device, such as a portable, compact, handheld, computer built-in or vehicle-mounted mobile apparatus, that exchange language and/or data with a wireless access network. For example, devices such as a personal communication service (PCS) phone, a cordless telephone, a session initiated protocol (SIP) phone, a wireless local loop (WLL) station, a personal digital assistant (PDA). The wireless terminal device may also be referred to as a system, a subscriber unit, a subscriber station, a mobile station, a mobile, a remote station, an access point, a remote terminal, an access terminal, a user terminal, a user agent or a user device, which is not limited in embodiments of the present disclosure.

In embodiments of the present disclosure, the SMF may receive a PDU session establishment request sent from a terminal device.

At step 202, a first message is sent to the PCF. The first message is configured to, determine by the PCF, that a PDU session to be established is used for a transmission of a first video service, based on single network slice selection assistance information (S-NSSAI) and a data network name (DNN).

In embodiments of the present disclosure, the first video service is a preset video service, and for example, the first video service may be an extended reality (XR) service or an interactive cloud gaming service, or the first video service may also be other video services, which is not limited in embodiments of the present disclosure.

In embodiments of the present disclosure, the SMF may send a first message to the PCF when receiving a PDU session establishment request, and for example, the first message may be an Npcf_SMpolicyControl_Create message. Accordingly, after receiving the first message sent by the SMF, the PCF may generate a PCC rule and send the PCC rule to the SMF in response to determining that a PDU session to be established is a transmission of the first video service based on the S-NSSAI and the DNN.

Further, in a possible implementation of embodiments of the present disclosure, the PCF may further determine whether the first video service includes a video service determined based on a network policy or application layer information. When the first video service includes a video service determined based on the network policy or the application layer information, it may be determined that the transmission of the first video frame needs to be guaranteed, in which case, the PCC rule may be generated. When the first video service does not include a video service determined based on the network policy or the application layer information, it is determined that the transmission of the first video frame does not need to be guaranteed, i.e., the first video frame and the second video frame may be transmitted by using the related art.

At step 203, the PCC rule sent by the PCF is received. The PCC rule is generated by the PCF in response to determining that a session a terminal device requests to establish is used for the transmission of the first video service.

The PCC rule indicates that a QoS flow transmission with the first QoS guarantee is used for a first service flow, and the first service flow includes a first video frame.

Further, in a possible implementation of embodiments of the present disclosure, the PCC rule may further indicate that a QoS flow transmission with a second QoS guarantee is used for a second service flow, the second service flow includes a second video frame, and the first QoS guarantee is higher than the second QoS guarantee.

In embodiments of the present disclosure, the SMF may receive the PCC rule sent by the PCF, generate packet detection information (PDI) based on the PCC rule and send the PDI to a UPF, and correspondingly, the UPF may detect a first video frame and a second video frame in a downlink packet based on a packet flow descriptor (PDR) in the PDI and label a corresponding QoS flow identifier (QFI) for the first video frame and the second video frame respectively in response to receiving the PDI; the QFI is a QFI labeled by an access network device based on the downlink packet, to use a QoS flow transmission with a first QoS guarantee for the first video frame, and use a QoS flow transmission with a second QoS guarantee for the second video frame.

The access network device may be a base station, and the base station may include a plurality of cells that provide services for a terminal device. According to different specific application occasions, the base station may also be referred to as an access point, or may be a device in an access network that communicates with a wireless terminal device via one or more sectors on an air interface in the access network, or other names. The access network device may be configured to replace a received air frame with an Internet Protocol (IP) packet as a router between a wireless UE and a remainder of an access network. The remainder of the access network may include an IP communication network. The access network device may further coordinate attribute management of an air interface. For example, the access network device involved in embodiments of the present disclosure may be a base transceiver station (BTS) in a global system for mobile communications (GSM) or code division multiple access (CDMA)), or may be an access network device (NodeB) in wide-band code division multiple access (WCDMA), or may be an evolutional Node B (eNB or e-NodeB) in a long term evolution (LTE) system, or may be a 5G base station (gNB) in a next generation system, or may be a home evolved Node B (HeNB), a relay node, a femto or a pico, which is not limited in embodiments of the present disclosure. In some network structures, the access network device may include a centralized unit (CU) node and a distributed unit (DU) node that may also be geographically separated.

In a possible implementation of embodiments of the present disclosure, the PDR may include frame header type matching information corresponding to the first video frame and/or the second video frame respectively. For example, when the first video frame is a key frame and the second video frame is a non-key frame, referring to Table 1, the frame header type matching information corresponding to the first video frame may be that the NAL type is 5, and the frame header type matching information corresponding to the second video frame may be that the NAL type is 1.

That is, the UPF may detect a first video frame and a second video frame in a downlink packet based on the frame header type matching information corresponding to the first video frame and/or the second video frame respectively included in the PDR, and label a corresponding QoS flow identifier (QFI) for the first video frame and the second video frame respectively, so that the access network device may use a QoS flow transmission with a first QoS guarantee for the first video frame, and use a QoS flow transmission with a second QoS guarantee for the second video frame based on the QFI labeled for the downlink packet.

In another possible implementation of embodiments of the present disclosure, the PDR may include label data corresponding to the first video frame and/or the second video frame respectively. The label data may include at least one of ToS information; DSCP information; or traffic class information.

That is, the UPF may detect a first video frame and a second video frame in a downlink packet based on label data corresponding to the first video frame and/or the second video frame respectively included in the PDR, and label a corresponding QoS flow identifier (QFI) for the first video frame and the second video frame respectively, so that the access network device may use a QoS flow transmission with a first QoS guarantee for the first video frame, and use a QoS flow transmission with a second QoS guarantee for the second video frame based on the QFI labeled for the downlink packet.

In the method for video transmission in embodiments of the present disclosure, a policy and charging control (PCC) rule sent by a policy control function (PCF) is received by the SMF. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame. Thus, a transmission for the first video frame can be achieved, and a QoS flow with a specific applicable QoS guarantee can be provided, to ensure a reliable and on-time transmission of the first video frame.

The above third embodiment is described below in combination with an embodiment A.

In the embodiment A, as illustrated in FIG. 4, a first video frame, for example a key frame, is indicated and distinguished through a PDU session establishment process.

At step 1, the SMF receives a PDU session establishment request sent by the terminal device.

At step 2, the SMF sends an Npcf_SMpolicyControl_Create message (that is, a first message) to the PCF. Based on S-NSSAI, a DNN, and other information, the PCF determines that the established PDU session is used for the first video service, for example, a transmission of an XR service or an interactive cloud gaming service. The PCF determines whether the first video service includes a video service determined based on a network policy or application layer information, and if so, the PCF determines that the transmission of the first video frame needs to be guaranteed, in which case, the generated PCC rule indicates to guarantee a transmission for the first video frame, that is, a higher QoS guarantee is adopt for the first video frame and a common QoS guarantee is adopted for the second video frame. For example, a GBR QoS guarantee may be adopted for the first video frame, and a non-GBR QoS guarantee or a lower GBR QoS guarantee may be adopted for the second video frame.

As an example, the PCC rule may be as illustrated in Table 2.

TABLE 2

| PCC rule ID | service data flow template | 5QI |
|---|---|---|
| PCC Rule 1 | Packet filter 1: IP-5 tuple A, NAL type = 1 | Value defined as a delay critical GBR QoS flow |
| PCC Rule 2 | Packet filter 2: IP-5 tuple A | Value defined as a non-GBR QoS flow, For example, the value is 80 |

5QI is defined in a 3rd Generation Partnership Project (3GPP) standard 23.501, where 5QI is a scalar configured to point to a QoS feature.

In Table 2, frame header information, i.e. a NAL type, is included in a packet filter. When the NAL type=1, the video frame is a key frame, and in order to guarantee a reliable and on-time transmission of the key frame, the key frame may be transmitted via the GBR QoS flow based on the PCC Rule 1, while when the NAL type is not 1, e.g. 5, the video frame is a non-key frame and may be transmitted via the non-GBR QoS flow based on the PCC Rule 2.

At step 3, the PCF sends the PCC rule to the SMF.

At step 4, the SMF generates PDI based on the PCC rule to ensure that the first video frame is mapped to a QoS flow with a higher QoS guarantee. The SMF sends the PDI to a UPF (N4_Session_Setup).

At step 5, after receiving the PDI, the UPF may detect a first video frame and a second video frame in a downlink packet based on the PDR in the PDR, and label corresponding QFIs for the first video frame and the second video frame respectively, and send the corresponding QFIs labeled for the first video frame and the second video frame to the SMF (N4_Session_Setup response). The PDR may include packet filter information.

At step 6, the SMF generates a QoS profile based on the PCC rule. The QoS profile may include the QFIs corresponding to the first video frame and the second video frame, and sends the QoS profile to an access network device (a PDU session resource setup request).

At step 7, the access network device returns a response (PDU session resource setup response). The access network device may provide the first QoS guarantee for the first video frame and the second QoS guarantee for the second video frame based on the QFI labeled for the downlink packet subsequently.

In another possible implementation of embodiments of the present disclosure, the specific process that the PCF determines that the transmission of the first video frame needs to be guaranteed may be: the PCF determines that the transmission of the first video frame needs to be guaranteed in response to determining that the access network device is incapable of guaranteeing the QoS of the first video service transmission. The above process is described below in combination with the fourth embodiment.

Figure 5:
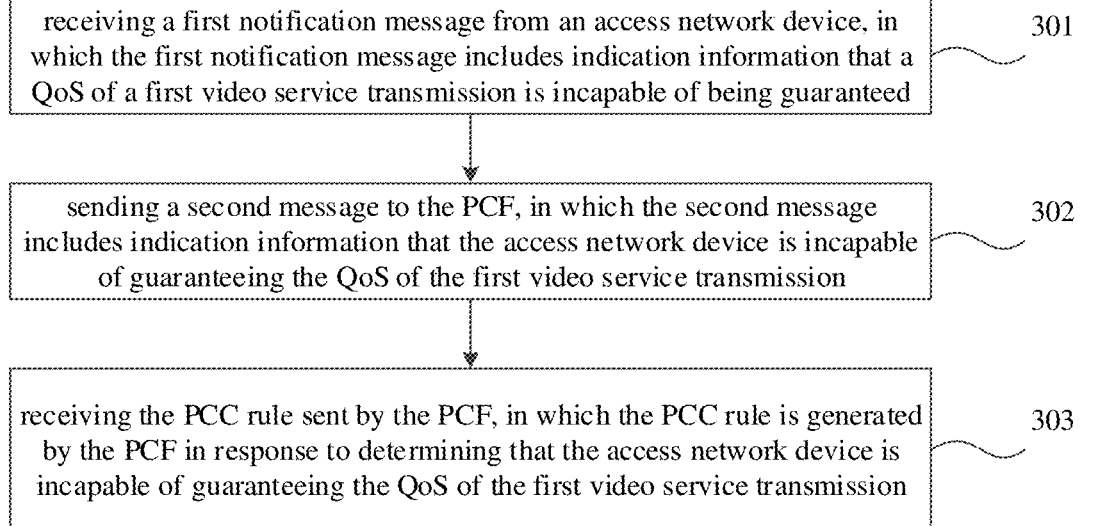
FIG. 5 is a flowchart illustrating a method for video transmission provided in a fourth embodiment of the present disclosure.

FIG. 5 is a flowchart illustrating a method for video transmission provided in a fourth embodiment of the present disclosure.

As illustrated in FIG. 5, the method for video transmission is applicable to an SMF. The method may include the following steps.

At step 301, a first notification message from an access network device is received. The first notification message includes indication information that a QoS of a first video service transmission is incapable of being guaranteed.

In embodiments of the present disclosure, the access network device may send a first notification message to the SMF in response to being incapable of guaranteeing the QoS of the first video service transmission.

In a possible implementation of embodiments of the present disclosure, the first notification message, may be generated by the access network after releasing the QoS flow used by the first video service in response to determining that the QoS of the first video service transmission is incapable of being guaranteed, or may be generated by the access network device in response to determining that the QoS of the first video service transmission is incapable of being guaranteed and determining that the QoS flow adopted by the first video service enables a notification control mechanism without releasing the QoS flow. The first notification message includes indication information that the QoS of the first video service transmission is incapable of being guaranteed.

At step 302, a second message is sent to the PCF. The second message includes indication information that the access network device is incapable of guaranteeing the QoS of the first video service transmission.

In embodiments of the present disclosure, the SMF may send a second message to the PCF in response to receiving the first notification message, and for example, the second message may be an Npcf_SMpolicyControl_Create message. Correspondingly, the PCF may generate a PCC rule when receiving the second message, and send the PCC rule to the SMF.

Further, in a possible implementation of embodiments of the present disclosure, the PCF may further determine whether the first video service includes a video service determined based on a network policy or application layer information, and when the first video service includes a video service determined based on the network policy or the application layer information, it may be determined that the transmission of the first video frame needs to be guaranteed, in which case, the PCC rule may be generated, and when the first video service does not include a video service determined based on the network policy or the application layer information, it is determined that the transmission of the first video frame does not need to be guaranteed, i.e., the first video frame and the second video frame may be transmitted by using the related art.

At step 303, the PCC rule sent by the PCF is received. The PCC rule is generated by the PCF in response to determining that the access network device is incapable of guaranteeing the QoS of the first video service transmission.

The PCC rule indicates that a QoS flow transmission with a first QoS guarantee is used for a first service flow, and the first service flow includes a first video frame.

Further, in a possible implementation of embodiments of the present disclosure, the PCC rule may further indicate that a QoS flow transmission with a second QoS guarantee is used for a second service flow, the second service flow includes a second video frame, and the first QoS guarantee is higher than the second QoS guarantee.

In embodiments of the present disclosure, the SMF may receive the PCC rule sent by the PCF, generate packet detection information (PDI) based on the PCC rule and send the PDI to a UPF, so that the UPF updates a PDR based on the PDI, and detects a first video frame and a second video frame in a downlink packet based on the updated PDR and label a corresponding QoS flow identifier (QFI) for the first video frame and the second video frame respectively in the downlink packet. The access network device, based on the QFI labelled for the downlink packet, uses a QoS flow transmission with a first QoS guarantee for the first video frame, and uses a QoS flow transmission with a second QoS guarantee for the second video frame.

In the method for video transmission in embodiments of the present disclosure, a policy and charging control (PCC) rule sent by a policy control function (PCF) is received by the SMF. The PCC rule is generated by the PCF in response to determining that a transmission of a first video frame needs to be guaranteed, the PCC indicates that a QoS flow transmission with a first QoS guarantee is used for a first service flow, and the first service flow includes a first video frame. Thus, a transmission for the first video frame can be achieved, and a QoS flow with a specific applicable QoS guarantee can be provided, to ensure a reliable and on-time transmission of the first video frame.

The above fourth embodiment is described below in combination with an embodiment B.

In the embodiment B, as illustrated in FIG. 6, a first video frame guarantee transmission is enabled when a QoS of a first video service transmission is incapable of being guaranteed.

At step 1, the first video service, for example, an XR service or a cloud gaming service that generally adopts a GBR QoS flow, may release a QoS flow used by the first video service (for example, a GBR QoS flow) when the access network device is incapable of guaranteeing the QoS of the first video service transmission, or, the access network device determines that the QoS flow adopted by the first video service enables a notification control mechanism, in which case, the access network device may send a first notification message without releasing the QoS flow adopted by the first video service. The first notification message is configured to indicate that the access network device guarantees the QoS of the first video service transmission.

At step 2, the SMF may send a second message to the PCF when receiving the first notification message, such as an Npcf_SMpolicyControl_Create message. The PCF determines whether the first video service includes a video service determined based on a network policy or application layer information, and if so, the PCF determines that the transmission of the first video frame needs to be guaranteed, in which case, different QoS guarantees are provided for the first video frame and the second video frame. Therefore, the PCF may modify a PCC rule to indicate to adopt a higher QoS guarantee for the first video frame and adopt a common QoS guarantee for the second video frame, and for example, to indicate to adopt a GBR QoS guarantee for the first video frame and adopt a non-GBR QoS guarantee or a lower GBR QoS guarantee for the second video frame.

At step 3, the PCF sends the PCC rule to the SMF.

At step 4, the SMF regenerates PDI based on the PCC rule to ensure that only the first video frame is mapped to a QoS flow with a first QoS guarantee, for example, a QoS flow with a GBR QoS guarantee. The SMF sends the PDI to a UPF (N4_Session_Modify).

At step 5, the UPF may update the PDR based on the PDI in response to receiving the PDI. The first video frame and the second video frame in the downlink packet are detected based on the updated PDR, corresponding QFIs are labeled for the first video frame and the second video frame in the downlink packet respectively, and the corresponding QFIs labelled for the first video frame and the second video frame are sent to the SMF (a N4_Session_Modify response).

The access network device, based on the QFI labelled for the downlink packet, uses a QoS flow transmission with a first QoS guarantee for the first video frame, and uses a QoS flow transmission with a second QoS guarantee for the second video frame.

At step 6, when the access network device releases the QoS flow adopted by the first video service, the SMF needs to request the access network device to reestablish the QoS flow. For details, refer to step 6 of the embodiment A. When the access network device does not release the QoS flow adopted by the first video service, the SMF updates a QoS profile, and requests the access network device to modify a QoS profile of the above QoS flow (a PDU session resource setup/modify request).

At step 7, the access network device returns a response (a PDU session resource setup/modify response).

In order to illustrate the above first embodiment and the second embodiment, a method for video transmission is further provided in the disclosure. FIG. 7 is a flowchart illustrating a method for video transmission in a fifth embodiment of the present disclosure.

As illustrated in FIG. 7, the method for video transmission is applicable to the SMF, and may include the following steps.

At step 401, a PDU session establishment request sent from a terminal device is received.

At step 402, a first message is sent to the PCF. The first message is configured to, determine by the PCF, that a PDU session to be established is used for a transmission of a first video service, based on S-NSSAI and DNN.

In embodiments of the present disclosure, steps 401 and 402 may be implemented in any one way of each embodiment of the present disclosure, which is not limited here nor repeated here.

At step 403, a PCC rule sent by the PCF is received. The PCC rule is generated by the PCF when determining that the first video service includes a video service determined based on a network policy or application layer information. The application layer information includes label data that is labeled for a video frame in a downlink packet and a corresponding QoS requirement.

The PCC rule indicates to use a QoS flow transmission with the first QoS guarantee for a first service flow, and the first service flow includes a first video frame.

Further, in a possible implementation of embodiments of the present disclosure, the PCC rule may further indicate to use a QoS flow transmission with a second QoS guarantee for a second service flow, the second service flow includes a second video frame, and the first QoS guarantee is higher than the second QoS guarantee.

In embodiments of the present disclosure, the label data that is labeled for the video frame in the downlink packet, for example, may be label data respectively corresponding to the first video frame and/or the second video frame in the downlink packet. The label data includes at least one of ToS information, DSCP information, or traffic class information.

In embodiments of the present disclosure, a QoS requirement corresponding to the video frame may be a QoS reference parameter, and the QoS reference parameter is configured to correspond to predefined QoS information. Alternatively, the QoS requirement may further be information such as a specific delay, a bandwidth, a packet loss rate or a processing priority, which will not be limited in embodiments of the present disclosure.

In embodiments of the present disclosure, the PCF may further determine whether the first video service includes a video service determined based on a network policy or application layer information in response to determining that that a PDU session to be established is a transmission of the first video service, and when the first video service includes the video service determined based on the network policy or application layer information, the PCF may determine that the transmission of the first video service needs to be guaranteed.

In embodiments of the present disclosure, the PCF may generate a PCC rule in response to determining that the transmission of the first video frame needs to be guaranteed. The PCC rule indicates that a QoS flow transmission with a first QoS guarantee is used for a first service flow, and correspondingly, the SMF may generate a QoS parameter of a QoS flow with the first QoS guarantee in response to receiving the PCC rule.

Further, in a possible implementation of embodiments of the present disclosure, the PCF may generate a PCC rule in response to determining that the transmission of the first video frame needs to be guaranteed. The PCC rule indicates that a QoS flow transmission with a first QoS guarantee is used for the first service flow and a QoS flow transmission with a second QoS guarantee is used for the second service flow, and correspondingly, the SMF may generate a QoS parameter of a QoS flow with the first QoS guarantee and a QoS parameter of a QoS flow with the second QoS guarantee based on the PCC rule in response to receiving the PCC rule.

In the method for video transmission in embodiments of the present disclosure, a policy and charging control (PCC) rule sent by a policy control function (PCF) is received by the SMF. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame. Thus, a transmission for the first video frame can be achieved, and a QoS flow with a specific applicable QoS guarantee can be provided, to ensure a reliable and on-time transmission of the first video frame.

The above fifth embodiment is described below in combination with an embodiment C.

Figure 8:
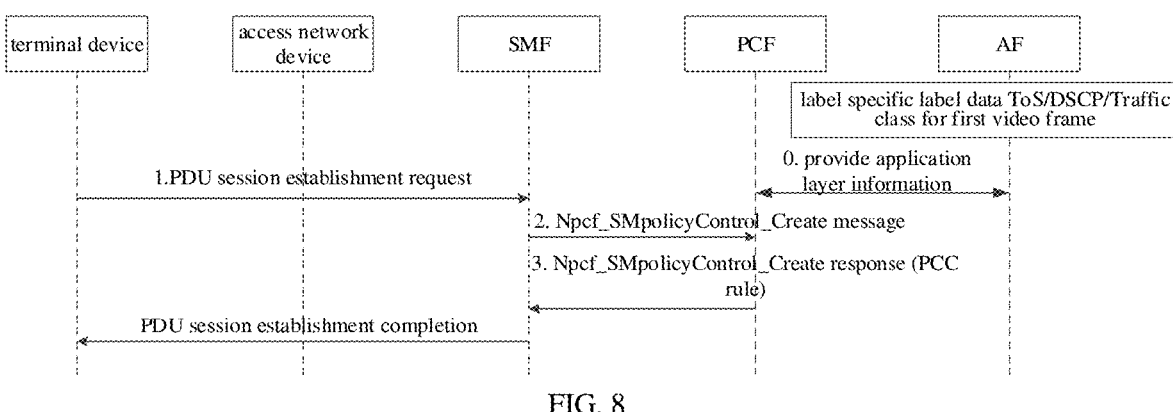
FIG. 8 is a flowchart illustrating that an application function (AF) requests to distinguish a first video frame in embodiments of the present disclosure.

In the embodiment C, as illustrated in FIG. 8, an application function (AF) actively requests to distinguish a first video frame.

At step 0, the AF actively requests to distinguish the transmission of the first video frame to a 5G core network (5GC) based on a policy, and the AF labels specific label data for the first video frame in a downlink packet. The specific label data may be a specific ToS or DSCP (IPv4) or traffic class (IPv6), and for example, the specific label data are labeled for the first video frame by using a reserved value or a high priority service. The PCF is requested to provide a more on-time and reliable transmission for the type of downlink packet labeled with the specific label data, and for example, a delay critical GBR service is adopted, i.e., a QoS flow transmission with a first QoS guarantee is used for the first video frame in the downlink packet, and a QoS flow transmission with a second QoS guarantee is used for other non-video key frames, i.e. a second video frame.

At step 1, the terminal device requests to establish a PDU session, and the SMF receives a PDU session establishment request sent by the terminal device.

At step 2, the SMF sends an Npcf_SMpolicyControl_Create message (that is, a first message) to the PCF. The PCF determines, based on information such as S-NSSAI and a DNN, that the established PDU session is used for a transmission of the first video service, for example, an XR service or an interactive cloud gaming service. When the PCF determines that the first video service includes a video service determined based on a network policy or application layer information according to application layer information provided in the AF at step 0, the PCF may indicate to guarantee a transmission for the first video frame, that is, indicate to adopt a higher QoS guarantee for the first video frame and adopt a common QoS guarantee for the second video frame. For example, a GBR QoS guarantee may be adopted for the first video frame, and a non-GBR QoS guarantee or a lower GBR QoS guarantee may be adopted for the second video frame.

As an example, the PCC rule may be as illustrated in Table 3.

TABLE 3

| PCC rule ID | service data flow template | 5QI |
|---|---|---|
| PCC Rule 1 | Packet filter1: IP-5 tuple A, ToS/DSCP/Traffic class = A | Value defined as a delay critical GBR QoS flow |
| PCC Rule 2 | Packet filter 2: IP-5 tuple A | Value defined as a non-GR QoS flow, For example, the value is 80 |

In Table 3, the label data, i.e. ToS/DSCP/Traffic class, is included in a packet filter. When the ToS/DSCP/Traffic class is A, the video frame is a first video frame, in which case, in order to guarantee a reliable and on-time transmission of the first video frame, the first video frame may be transmitted via the GBR QoS flow based on the PCC Rule 1; when the ToS/DSCP/Traffic class is not A, the video frame is a second video frame, in which case, the second video frame may be transmitted via the non-GBR QoS flow based on the PCC Rule 2.

At step 3, the PCF may send a PCC rule to the SMF, and the SMF may generate, based on the PCC rule, a QoS parameter of a QoS flow with the first QoS guarantee and a QoS parameter of a QoS flow with the second QoS guarantee. A subsequent process is same as the related art.

Figure 9:
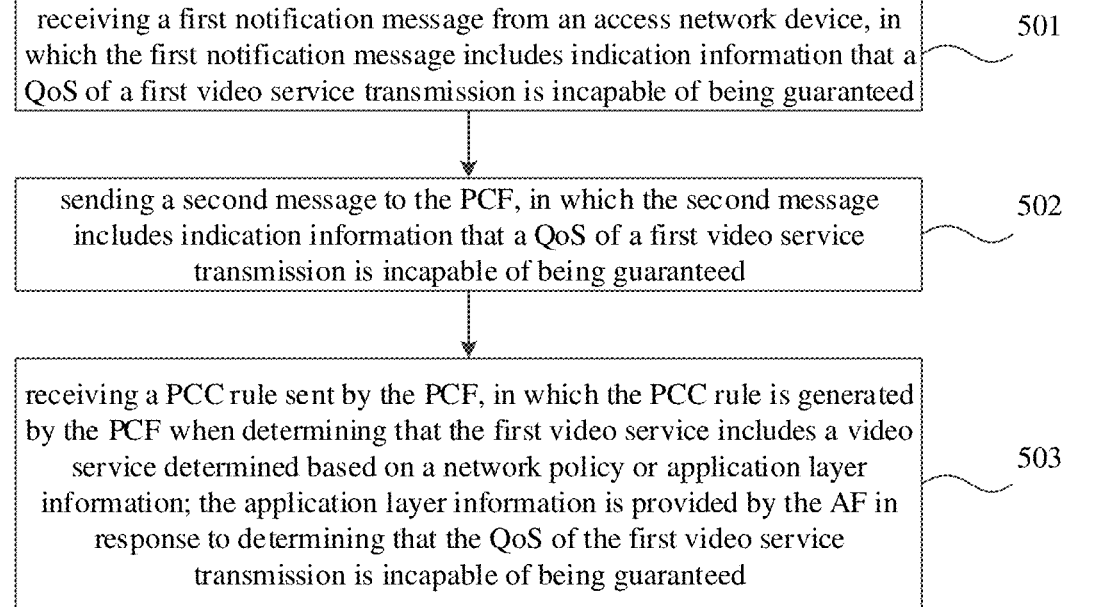
FIG. 9 is a flowchart illustrating a method for video transmission provided in a sixth embodiment of the present disclosure.

In order to illustrate the above first embodiment and the second embodiment, a method for video transmission is further provided in the disclosure. FIG. 9 is a flowchart illustrating a method for video transmission in a sixth embodiment of the present disclosure.

As illustrated in FIG. 9, the method for video transmission is applicable to the SMF. The method may include the following steps.

At step 501, a first notification message from an access network device is received. The first notification message includes indication information that a QoS of a first video service transmission is incapable of being guaranteed.

At step 502, a second message is sent to the PCF. The second message includes indication information that a QoS of a first video service transmission is incapable of being guaranteed.

In embodiments of the present disclosure, steps 501 and 502 may be implemented in any one way of each embodiment of the present disclosure, which is not limited here nor repeated here.

At step 503, a PCC rule sent by the PCF is received. The PCC rule is generated by the PCF when determining that the first video service includes a video service determined based on a network policy or application layer information. The application layer information is provided by the AF in response to determining that the QoS of the first video service transmission is incapable of being guaranteed.

The PCC rule indicates that a QoS flow transmission with the QoS guarantee is used for a first service flow, and the first service flow includes a first video frame.

Further, in a possible implementation of embodiments of the present disclosure, the PCC rule may further indicate that a QoS flow transmission with a second QoS guarantee is used for a second service flow, the second service flow includes a second video frame, and the first QoS guarantee is higher than the second QoS guarantee.

It needs to be noted that, the foregoing explanation of application layer information in the above fifth embodiment is applicable to the embodiment, which is not repeated here.

In embodiments of the present disclosure, the application layer information may be provided by the AF, and specifically, may be provided by the AF to the PCF in response to determining that the QoS of the first video service transmission is incapable of being guaranteed. The PCF may determine whether the first video service includes a video service determined based on a network policy or application layer information according to the network policy or the application information provided by the AF, and when the first video service includes the video service determined based on a network policy or application layer information, the PCF may determine that the transmission of the first video service needs to be guaranteed, in which case, a PCC rule may be generated, and sent to the SMF.

In embodiments of the present disclosure, when the PCC rule indicates that a QoS flow transmission with a first QoS guarantee is used for the first service flow, the SMF may generate a QoS parameter of a QoS flow with the first QoS guarantee based on the PCC rule in response to receiving the PCC rule, and initiate a PDU session modification process based on the QoS parameter of the QoS flow with the first QoS guarantee, to establish a QoS flow with the first QoS guarantee for transmitting the first service flow including the first video frame.

Further, in a possible implementation of embodiments of the present disclosure, when the PCC rule indicates that a QoS flow transmission with a first QoS guarantee is used for the first service flow and a QoS flow transmission with a second QoS guarantee is ues for the second service flow, in response to receiving the PCC rule, the SMF may generate a QoS parameter of a QoS flow with the first QoS guarantee and a QoS parameter of a QoS flow with the second QoS guarantee based on the PCC rule, and initiate a PDU session modification process based on the QoS parameter of the QoS flow with the first QoS guarantee and the QoS parameter of the QoS flow with the second QoS guarantee, to establish a QoS flow with the first QoS guarantee for transmitting the first service flow including the first video frame, and establish or modify a QoS flow with the second QoS guarantee for transmitting the second service flow including the second video frame.

In the method for video transmission in embodiments of the present disclosure, a policy and charging control (PCC) rule sent by a policy control function (PCF) is received by the SMF. The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame. Thus, a transmission for the first video frame can be achieved, and a QoS flow with a specific applicable QoS guarantee can be provided, to ensure a reliable and on-time transmission of the first video frame.

The above sixth embodiment is described below in combination with an embodiment D.

Figure 10:
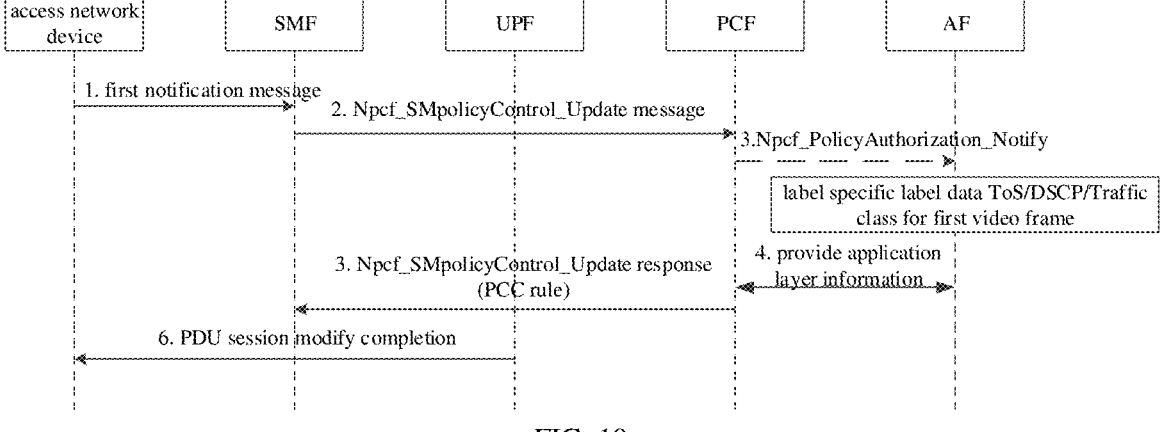
FIG. 10 is a flowchart illustrating that an application function (AF) determines and distinguishes a first video frame based on a notification of a policy control function (PCF) in embodiments of the present disclosure.

In the embodiment D, as illustrated in FIG. 10, an application function (AF) determines that a first video frame is distinguished based on a notification of a policy control function (PCF).

Steps 1 to 2 are same as steps 1 to 2 in the embodiment B.

At step 3, the PCF notifies the AF that a QoS requirement of the first video service cannot be satisfied (the PCF sends an Npcf_PolicyAuthorization_Notify message to the AF).

At step 4, the AF actively requests to distinguish the transmission of the first video frame to a 5GC based on a policy, and the AF labels specific label data for the first video frame in a downlink packet. The specific label data may be a specific ToS or DSCP (IPv4) or traffic class (IPv6), and for example, the specific label data are labeled for the first video frame by using a reserved value or a high priority service. The PCF is requested to provide a more on-time and reliable transmission for the type of downlink packet labeled with the specific label data, and for example, a delay critical GBR service is adopted, i.e., a QoS flow transmission with a first QoS guarantee is used for the first video frame in the downlink packet, and a QoS flow transmission with a second QoS guarantee is used for other non-video key frames, i.e. a second video frame.

At step 5, the PCF generates different PCC rules for the first video frame and the second video frame based on the QoS requirement provided by the AF, and for example, the PCC rules may be as illustrated in Table 3. The PCF may send a PCC rule to the SMF, and the SMF may generate, based on the PCC rule, a QoS parameter of a QoS flow with the first QoS guarantee and a QoS parameter of a QoS flow with the second QoS guarantee. The SMF may initiate, based on the QoS parameter of the QoS flow with the first QoS guarantee and the QoS parameter of the QoS flow with the second QoS guarantee, a PDU session modification process, to establish the QoS flow with the first QoS guarantee for transmitting the first service flow including the first video frame, and to establish or modify the QoS flow with the second QoS guarantee for transmitting the second service flow including the second video frame.

Based on the above embodiments, the PCF may generate a PCC rule for the transmission of the first video frame and the transmission of the second video frame respectively, in response to determining that the transmission of the first video frame needs to be guaranteed, and send the PCC rule to the SMF, and the SMF may generate a QoS parameter of the QoS flow respectively for transmitting the first video frame and the second video frame based on the PCC rule.

The PCF may determine whether the transmission of the first video frame needs to be guaranteed based on S-NSSAI, a DNN and application layer information provided by the AF. The first video frame may be distinguished based on a ToS/DSCP/Traffic class or frame header information.

Thus, the transmission of the first video frame, for example the key frame, can be provided with a high QoS guarantee, to ensure a reliable and on-time transmission of the first video frame, thereby avoiding that the second video frame is unable to be decoded due to a loss or a delay arrival of the first video frame, for example, avoiding that the P-frame and the B-frame are unable to be decoded due to a loss or a delay arrival of the I-frame, which improves the user experience.

The above is a method for video transmission executed by the SMF. A method for video transmission executed by the PCF is further provided in the disclosure.

FIG. 11 is a flowchart illustrating a method for video transmission in a seventh embodiment of the present disclosure.

An executive body of embodiments of the present disclosure is an apparatus for video transmission provided in the disclosure, and the apparatus for video transmission may be configured in a policy control function (PCF).

As illustrated in FIG. 11, the method for video transmission is applicable to the PCF. The method may include the following steps.

At step 601, a PCC rule is generated and sent to the SMF in response to determining that the transmission of the first video service needs to be guaranteed. The PCC rule indicates that a QoS flow transmission with a first QoS guarantee is used for a first service flow, and the first service flow includes a first video frame.

In embodiments of the present disclosure, the service flow may be a service flow corresponding to a video service. In order to facilitate distinguishing different service flows, in the present disclosure, the service flow including a first video frame may be referred to as a first service flow, and the first video frame may be, for example, a key frame, that is, an I-frame.

In embodiments of the present disclosure, the first QoS guarantee may be a relatively high QoS guarantee, and for example, the first QoS guarantee may be a GBR QoS guarantee.

In embodiments of the present disclosure, when the PCF determines that a transmission of a first video frame needs to be guaranteed, the PCF may generate a PCC rule, and send the PCC rule to the SMF, and correspondingly, the SMF may receive the PCC rule sent by the PCF. The PCC rule indicates that a QoS flow transmission with a first QoS guarantee is used for a first service flow, and the first service flow includes a first video frame. Thus, the first video frame, for example a key frame, in the service flow may be distinguished, which provides a high QoS guarantee for the transmission of the first video frame, to ensure a reliable and on-time transmission of the first video frame, thereby avoiding that other video frames are unable to be decoded due to a loss or a delay arrival of the first video frame, for example, avoiding that the P-frame and/or the B-frame is unable to be decoded due to a loss or a delay arrival of the I-frame, which improves the user experience.

Further, in a possible implementation of embodiments of the present disclosure, the PCC rule may further indicate that a QoS flow transmission with a second QoS guarantee is used for a second service flow, the second service flow includes a second video frame, and the first QoS guarantee is higher than the second QoS guarantee.

In embodiments of the present disclosure, a service flow including a second video frame may be referred to as a second service flow, and the second video frame may be, for example, a non-key frame, that is, a P-frame and/or a B-frame.

In embodiments of the present disclosure, the first QoS guarantee is higher than the second QoS guarantee, and for example, the first QoS guarantee may be a high QoS guarantee, and the second QoS guarantee may be a common QoS guarantee. As an example, the first QoS guarantee may be a GBR QoS, and the second QoS guarantee may be a non-GBR QoS or a low GBR QoS.

In embodiments of the present disclosure, the PCF may generate a PCC rule and send the PCC rule to the SMF in response to determining that a transmission of a first video frame needs to be guaranteed, and correspondingly, the SMF may receive the PCC rule sent by the PCF, in which the PCC rule indicates that a QoS flow transmission with a first QoS guarantee is used for a first service flow, and the first service flow includes a first video frame; and, the PCC rule further indicates that a QoS flow transmission with a second QoS guarantee is used for a second service flow, in which the second service flow includes a second video frame, and the first QoS guarantee is higher than the second QoS guarantee. Thus, the first video frame in the service flow may be distinguished, such as a key frame, to provide a high QoS guarantee for the transmission of the first video frame, to ensure a reliable and on-time transmission of the first video frame, thereby avoiding that the second video frame is unable to be decoded due to a loss or a delay arrival of the first video frame, for example, avoiding that the P-frame and/or the B-frame is unable to be decoded due to a loss or a delay arrival of the I-frame, which improves the user experience.

In a possible implementation of embodiments of the present disclosure, the PCF determines that the transmission of the first video frame needs to be guaranteed in response to determining that a session a terminal device requests to establish is used for the transmission of the first video service.

As an example, the PCF may receive a first message sent by the SMF. The first message is generated by the SMF in response to receiving a protocol data unit (PDU) session establishment request sent from the terminal device. It is determined that a PDU session to be established indicated by the first message is used for the transmission of the first video service based on the S-NSSAI and the DNN.

In a possible implementation of embodiments of the present disclosure, the PCF determines that the transmission of the first video frame needs to be guaranteed in response to determining that the access network device is incapable of guaranteeing the QoS of the first video service transmission.

As an example, the PCF may determine that the access network device is incapable of guaranteeing the QoS of the first video service transmission based on a second message sent by the SMF. The second message is generated by the SMF in response to receiving a first notification message from the access network device, and the first notification message includes indication information that the QoS of the first video service transmission is incapable of being guaranteed.

As a possible implementation, the first notification message is generated by the access network device after releasing the QoS flow used by the first video service in response to determining that the QoS of the first video service transmission is incapable of being guaranteed, or generated by the access network device in response to determining that the QoS of the first video service transmission is incapable of being guaranteed and determining that the QoS flow adopted by the first video service enables a notification control mechanism without releasing the QoS flow.

As a possible implementation, the first video service includes a video service determined based on a network policy or application layer information.

As a possible implementation, the application layer information includes label data that is labeled for a video frame in a downlink packet and a corresponding QoS requirement.

As a possible implementation, the application layer information is provided by an application function (AF) in response to the QoS of the first video service transmission being incapable of being guaranteed.

As a possible implementation, the label data include at least one of ToS information, DSCP information, or traffic class information.

As a possible implementation, the QoS flow with the first QoS guarantee is a guaranteed bit rate (GBR) QoS flow, and the QoS flow with the second QoS guarantee is a non-GBR QoS flow.

It needs to be noted that, descriptions of the method for video transmission executed by the SMF in any one embodiment of FIGS. 1 to 10 and descriptions of technical details are applicable to the above PCF, with a similar implementation principle, which will not be repeated here.

In the method for video transmission in embodiments of the present disclosure, a PCC rule is generated and sent to the SMF in response to determining that a transmission of a first video frame needs to be guaranteed; the PCC rule indicates that a QoS flow transmission with a first QoS guarantee is used for a first service flow, and the first service flow includes a first video frame. Thus, a transmission for the first video frame can be achieved, and a QoS flow with a specific applicable QoS guarantee can be provided, to ensure a reliable and on-time transmission of the first video frame.

The technical solution provided in embodiments of the present disclosure is applicable to a variety of systems, particularly a 5G system. For example, the applicable system may be a global system of mobile communication (GSM) system, a code division multiple access (CDMA) system, a wideband code division multiple access (WCDMA) system, a general packet radio service (GPRS) system, a long term evolution (LTE) system, a frequency division duplex (FDD) system, a time division duplex (TDD) system, a long term evolution advanced (LTE-A) system, a universal mobile telecommunication system (UMTS), a worldwide interoperability for microwave access (WiMAX) system, a 5G new radio (NR) system, etc. The variety of systems include a terminal device and a network device. The system may further include core network components, such as an evolved packet system (EPS) or a 5G system (5GS).

To achieve the above embodiments, a session management function (SMF) is provided in the disclosure.

FIG. 12 is a diagram illustrating a structure of a session management function (SMF) in an eighth embodiment of the present disclosure.

As illustrated in FIG. 12, the SMF may include a transceiver 1200, a processor 1210 and a memory 1220.

The memory 1220 is configured to store a computer program; the transceiver 1200 is configured to transmit and receive data under a control of a processor 1210; and the processor 1210 is configured to read the computer program in the memory 1220 and perform an operation of: receiving a policy and charging control (PCC) rule sent by a policy control function (PCF); the PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame.

The transceiver 1200 is configured to transmit and receive data under a control of the processor 1210.

In FIG. 12, a bus architecture may include any number of interconnected buses and bridges, and specifically link one or more processors represented by the processor 1210 and various circuits of memories represented by the memory 1220. The bus architecture may further link various other circuits such as peripheral equipments, voltage regulators and power management circuits, which are well known in the art, which will not be further described herein. A bus interface provides an interface. The transceiver 1200 may be a plurality of elements, i.e., include a transmitter and a receiver, and units for communicating with various other apparatuses on transmission media. The transmission media include a wireless channel, a wired channel, an optic cable and other transmission media. The processor 1210 is in charge of managing the bus architecture and general processings, and the memory 1220 may store data used by processor 1210 in performing operations.

The processor 1210 may be a CPU, an ASIC, an FPGA or a CPLD, and may adopt a multi-core architecture.

In a possible implementation of the present disclosure, the PCC rule further indicates that a QoS flow transmission with a second QoS guarantee is used for a second service flow, the second service flow includes a second video frame, and the first QoS guarantee is higher than the second QoS guarantee.

In a possible implementation of the present disclosure, before receiving the PCC rule sent by the PCF, the method further includes: receiving a protocol data unit (PDU) session establishment request sent from a terminal device; and sending a first message to the PCF. The first message is configured to, determine by the PCF, that a PDU session to be established is used for a transmission of a first video service, based on single network slice selection assistance information (S-NSSAI) and a data network name (DNN).

In a possible implementation of the present disclosure, after receiving the PCC rule sent by the PCF, the method further includes: generating packet detection information (PDI) based on the PCC rule; and sending the PDI to a user plane function (UPF) to enable the UPF to detect a first video frame and a second video frame in a downlink packet based on a packet flow descriptor (PDR) in the PDI and label a corresponding QoS flow identifier (QFI) for the first video frame and the second video frame respectively.

In a possible implementation of the present disclosure, the PDR includes frame header type matching information corresponding to the first video frame and/or the second video frame respectively; or, the PDR includes label data corresponding to the first video frame and/or the second video frame respectively.

In a possible implementation of the present disclosure, before receiving the PCC rule sent by the PCF, the method further includes: receiving a first notification message from an access network device, in which the first notification message includes indication information that a QoS of a first video service transmission is incapable of being guaranteed; and sending a second message to the PCF, in which the second message includes indication information that a QoS of a first video service transmission is incapable of being guaranteed.

In a possible implementation of the present disclosure, the first notification message is generated by the access network device after releasing the QoS flow used by the first video service in response to determining that the QoS of the first video service transmission is incapable of being guaranteed, or generated by the access network device in response to determining that the QoS of the first video service transmission is incapable of being guaranteed and determining that the QoS flow adopted by the first video service enables a notification control mechanism without releasing the QoS flow.

In a possible implementation of the present disclosure, the first video service includes a video service determined based on a network policy or application layer information.

In a possible implementation of the present disclosure, the application layer information includes label data that is labeled for a video frame in a downlink packet and a corresponding QoS requirement.

In a possible implementation of embodiments of the present disclosure, the application layer information is provided by an application function (AF) in response to determining that the QoS of the first video service transmission is incapable of being guaranteed.

In a possible implementation of the present disclosure, the label data includes at least one of ToS information, DSCP information, or traffic class information.

In a possible implementation of the present disclosure, after receiving the PCC rule sent by the PCF, the method further includes: generating, based on the PCC rule, a QoS parameter of a QoS flow with the first QoS guarantee and a QoS parameter of a QoS flow with the second QoS guarantee; and initiating, based on the QoS parameter of the QoS flow with the first QoS guarantee and the QoS parameter of the QoS flow with the second QoS guarantee, a PDU session modification process, to establish the QoS flow with the first QoS guarantee for transmitting the first service flow, and to establish or modify the QoS flow with the second QoS guarantee for transmitting the second service flow.

In a possible implementation of the present disclosure, the QoS flow with the first QoS guarantee is a guaranteed bit rate (GBR) QoS flow, and the QoS flow with the second QoS guarantee is a non-GBR QoS flow.

It needs to be noted that, the SMF provided in embodiments of the present disclosure can implement all method steps achieved by method embodiments in FIGS. 1 to 9, and can achieve the same technical effect, and the same parts in the method embodiments are not repeated in embodiments of the present disclosure.

To achieve the above embodiments, a policy control function (PCF) is provided in the disclosure.

FIG. 13 is a diagram illustrating a structure of a policy control function (PCF) in a ninth embodiment of the present disclosure.

As illustrated in FIG. 13, the PCF may include a transceiver 1300, a processor 1310 and a memory 1320.

The memory 1320 is configured to store a computer program; the transceiver 1300 is configured to transmit and receive data under a control of a processor 1310; and the processor 1310 is configured to read the computer program in the memory 1320 and perform an operation of: in response to determining that a transmission of a first video frame needs to be guaranteed, generating a policy and charging control (PCC) rule, and sending the PCC rule to a session management function (SMF);

The PCC rule indicates that a QoS flow transmission with the QoS guarantee is used for a first service flow, and the first service flow includes a first video frame.

The transceiver 1300 is configured to transmit and receive data under a control of the processor 1310.

In FIG. 13, a bus architecture may include any number of interconnected buses and bridges, and specifically link one or more processors represented by the processor 1310 and various circuits of memories represented by the memory 1320. The bus architecture may further link various other circuits such as peripheral equipments, voltage regulators and power management circuits, which are well known in the art, which will not be further described herein. A bus interface provides an interface. The transceiver 1300 may be a plurality of elements, i.e., include a transmitter and a receiver, and units for communicating with various other apparatuses on transmission media. The transmission media include a wireless channel, a wired channel, an optic cable and other transmission media. The processor 1310 is in charge of managing the bus architecture and general processings, and the memory 1320 may store data used by processor 1310 in performing operations.

The processor 1310 may be a CPU, an ASIC, an FPGA or a CPLD, and may adopt a multi-core architecture.

In a possible implementation of embodiments of the present disclosure, the PCC rule further indicates that a QoS flow transmission with a second QoS guarantee is used for a second service flow, the second service flow includes a second video frame, and the first QoS guarantee is higher than the second QoS guarantee.

In a possible implementation of the present disclosure, determining that the transmission of the first video frame needs to be guaranteed includes: determining that the transmission of the first video frame needs to be guaranteed in response to determining that a session a terminal device requests to establish is used for the transmission of the first video service.

In a possible implementation of the present disclosure, determining that the session the terminal device requests to establish is used for the preset transmission of the first video service includes: receiving a first message sent by the SMF, in which the first message is generated by the SMF in response to receiving a protocol data unit (PDU) session establishment request sent from the terminal device; and determining a PDU session to be established indicated by the first message is used for the transmission of the first video service, based on single network slice selection assistance information (S-NSSAI) and a data network name (DNN).

In a possible implementation of the present disclosure, determining that the transmission of the first video frame needs to be guaranteed includes: determining that the transmission of the first video frame needs to be guaranteed in response to determining that an access network device is incapable of guaranteeing a QoS of a first video service transmission.

In a possible implementation of the present disclosure, the method further includes: determining that the access network device is incapable of guaranteeing the QoS of the first video service transmission based on a second message sent by the SMF. The second message is generated by the SMF in response to receiving a first notification message from the access network device, and the first notification message includes indication information that the QoS of the first video service transmission is incapable of being guaranteed.

In a possible implementation of the present disclosure, the first notification message is generated by the access network device after releasing the QoS flow used by the first video service in response to determining that the QoS of the first video service transmission is incapable of being guaranteed, or generated by the access network device in response to determining that the QoS of the first video service transmission is incapable of being guaranteed and determining that the QoS flow adopted by the first video service enables a notification control mechanism without releasing the QoS flow.

In a possible implementation of the present disclosure, the first video service includes a video service determined based on a network policy or application layer information.

In a possible implementation of the present disclosure, the application layer information includes label data that is labeled for a video frame in a downlink packet and a corresponding QoS requirement.

In a possible implementation of the present disclosure, the application layer information is provided by an application function (AF) in response to the QoS of the first video service transmission being incapable of being guaranteed.

In a possible implementation of embodiments of the present disclosure, the label data includes at least one of ToS information, DSCP information, or traffic class information.

In a possible implementation of embodiments of the present disclosure, the QoS flow with the first QoS guarantee is a guaranteed bit rate (GBR) QoS flow, and the QoS flow with the second QoS guarantee is a non-GBR QoS flow.

It needs to be noted that, the PCF provided in embodiments of the present disclosure can implement all method steps achieved by method embodiments in FIG. 11, and can achieve the same technical effect, and the same parts in the method embodiments are not repeated in embodiments of the present disclosure.

Corresponding to the method for video transmission provided in embodiments of FIGS. 1 to 9, an apparatus for video transmission is further provided in the present disclosure. Since the apparatus for video transmission provided in the embodiments of the present disclosure corresponds to the method for video transmission provided in embodiments of FIGS. 1 to 9, the implementation of the method for video transmission is also applicable to the apparatus for video transmission provided in the embodiment, which will not be described in embodiments of the disclosure.

Figure 14:
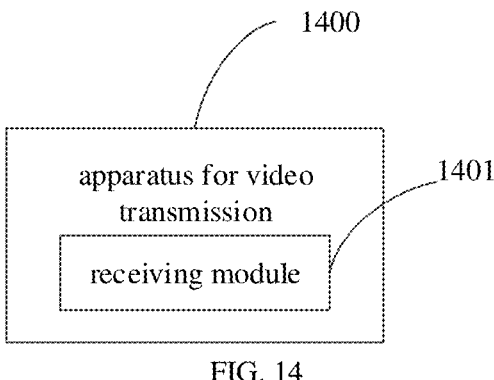
FIG. 14 is a diagram illustrating a structure of an apparatus for video transmission provided in a tenth embodiment of the present disclosure.

FIG. 14 is a diagram illustrating a structure of an apparatus for video transmission provided in a tenth embodiment of the present disclosure.

As illustrated in FIG. 14, the apparatus 1400 for video transmission is applicable to a session management function (SMF), and may include a receiving module 1401.

The receiving module 1401 is configured to receive a policy and charging control (PCC) rule sent by a policy control function (PCF). The PCC rule is generated by the PCF in response to determining that a transmission of a first video frame needs to be guaranteed, the PCC rule indicates that a QoS flow transmission with a first QoS guarantee is used for a first service flow, and the first service flow includes a first video frame.

In a possible implementation of embodiments of the present disclosure, the PCC rule further indicates that a QoS flow transmission with a second QoS guarantee is used for a second service flow, the second service flow includes a second video frame, and the first QoS guarantee is higher than the second QoS guarantee.

In a possible implementation of the present disclosure, the receiving module 1401 is further configured to receive a protocol data unit (PDU) session establishment request sent from a terminal device.

The apparatus 1400 for video transmission may further include a first sending module.

The first sending module is configured to send a first message to the PCF. The first message is configured to, determine by the PCF, that a PDU session to be established is used for a transmission of a first video service, based on single network slice selection assistance information (S-NS-SAI) and a data network name (DNN).

Further, in another possible implementation of the present disclosure, the apparatus 1300 for video transmission may further include a first generating module and a first sending module.

The first generating module is configured to generate PDI based on a PCC rule.

The first sending module is configured to send the PDI to a user plane function (UPF) to enable the UPF to detect a first video frame and a second video frame in a downlink packet based on a PDR in the PDI and label a corresponding QoS flow identifier (QFI) for the first video frame and the second frame respectively.

Further, in another possible implementation of the present disclosure, the PDR includes frame header type matching information corresponding to the first video frame and/or the second video frame respectively; or, the PDR includes label data corresponding to the first video frame and/or the second video frame respectively.

Further, in another possible implementation of the present disclosure, the receiving module 1401 is further configured to receive a first notification message sent from an access network device. The first notification message is configured to indicate that a QoS of a first video service transmission is incapable of being guaranteed.

The apparatus 1400 for video transmission may further include a second sending module.

The second sending module is configured to, send a second message to the PCF. The second message is configured to indicate that the access network device is incapable of guaranteeing a QoS of a first video service transmission.

Further, in another possible implementation of the present disclosure, the first notification message, is generated by the access network device after releasing the QoS flow used by the first video service in response to determining that the QoS of the first video service transmission is incapable of being guaranteed, or generated by the access network device in response to determining that the QoS of the first video service transmission is incapable of being guaranteed and determining that the QoS flow adopted by the first video service enables a notification control mechanism without releasing the QoS flow.

Further, in another possible implementation of the present disclosure, the first video service includes a video service determined based on a network policy or application layer information.

Further, in another possible implementation of the present disclosure, the application layer information includes label data that is labeled for a video frame in a downlink packet and a corresponding QoS requirement.

Further, in another possible implementation of the present disclosure, the application layer information is provided by an application function (AF) in response to determining that the QoS of the first video service transmission is incapable of being guaranteed.

Further, in another possible implementation of the present disclosure, the label data includes at least one of ToS information, DSCP information, or traffic class information.

Further, in another possible implementation of the present disclosure, the apparatus 1300 for video transmission may further include a second generating module and an initiating module.

The second generating module is configured to generate, based on the PCC rule, a QoS parameter of a QoS flow with the first QoS guarantee and a QoS parameter of a QoS flow with the second QoS guarantee.

The initiating module is configured to initiate, based on the QoS parameter of the QoS flow with the first QoS guarantee and the QoS parameter of the QoS flow with the second QoS guarantee, a PDU session modification process, to establish the QoS flow with the first QoS guarantee for transmitting the first service flow, and to establish or modify the QoS flow with the second QoS guarantee for transmitting the second service flow.

Further, in another possible implementation of the present disclosure, the QoS flow with the first QoS guarantee is a guaranteed bit rate (GBR) QoS flow, and the QoS flow with the second QoS guarantee is a non-GBR QoS flow.

It needs to be noted that, the apparatus for video transmission provided in embodiments of the present disclosure can implement all method steps achieved by method embodiments in FIGS. 1 to 9, and can achieve the same technical effect, and the same parts in the method embodiments are not repeated in embodiments of the present disclosure.

Corresponding to the method for video transmission provided in the embodiment of FIG. 11, an apparatus for video transmission is further provided in the present disclosure. Since the apparatus for video transmission provided in the embodiments of the present disclosure corresponds to the method for video transmission provided in the embodiment of FIG. 11, the implementation of the method for video transmission is also applied to the apparatus for video transmission provided in the embodiment, which will not be described in embodiments of the disclosure.

Figure 15:
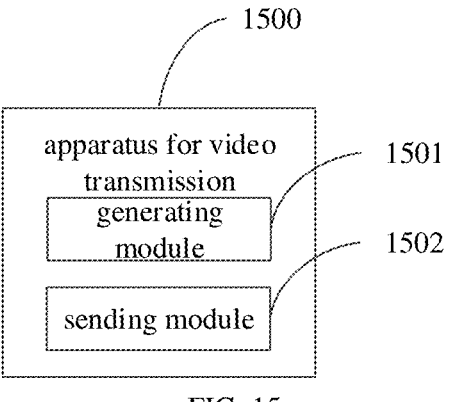
FIG. 15 is a diagram illustrating a structure of an apparatus for video transmission provided in an eleventh embodiment of the present disclosure.

FIG. 15 is a diagram illustrating a structure of an apparatus for video transmission in an eleventh embodiment of the present disclosure.

As illustrated in FIG. 15, the apparatus 1500 for video transmission may include a generating module 1501 and a sending module 1502.

The generating module 151 is configured to, in response to determining that a transmission of a first video frame needs to be guaranteed, generate a policy and charging control (PCC) rule.

The sending module 1502 is configured to send the PCC rule to a session management function (SMF).

The PCC rule indicates that a QoS flow transmission with the QoS guarantee is used for a first service flow, and the first service flow includes a first video frame.

In a possible implementation of the present disclosure, the PCC rule further indicates that a QoS flow transmission with a second QoS guarantee is used for a second service flow, the second service flow includes a second video frame, and the first QoS guarantee is higher than the second QoS guarantee.

In a possible implementation of the present disclosure, the generating module 1501 is configured to determine that the transmission of the first video frame needs to be guaranteed in response to determining that a session a terminal device requests to establish is used for the transmission of the first video service.

In a possible implementation of the present disclosure, the generating module 1501 is configured to receive a first message sent by the SMF, in which the first message is generated by the SMF in response to receiving a protocol data unit (PDU) session establishment request sent from the terminal device; and determine a PDU session to be established indicated by the first message is used for the transmission of the first video service, based on single network slice selection assistance information (S-NSSAI) and a data network name (DNN).

In a possible implementation of the present disclosure, the generating module 1501 is configured to determine that the transmission of the first video frame needs to be guaranteed in response to determining that the access network device is incapable of guaranteeing a QoS of a first video service transmission.

In a possible implementation of the present disclosure, the apparatus 1500 for video transmission may further include a determining module and a first notification module.

The determining module is configured to determine that the access network device is incapable of guaranteeing the QoS of the first video service transmission based on a second message sent by the SMF; the second message is generated by the SMF in response to receiving a first notification message from the access network device; and the first notification message is configured to indicate that the QoS of the first video service transmission is incapable of being guaranteed.

In a possible implementation of the present disclosure, the first notification message, is generated by the access network device after releasing the QoS flow used by the first video service in response to determining that the QoS of the first video service transmission is incapable of being guaranteed, or generated by the access network device in response to determining that the QoS of the first video service transmission is incapable of being guaranteed and determining that the QoS flow adopted by the first video service enables a notification control mechanism without releasing the QoS flow.

In a possible implementation of the present disclosure, the first video service includes a video service determined based on a network policy or application layer information.

In a possible implementation of the present disclosure, the application layer information includes label data that is labeled for a video frame in a downlink packet and a corresponding QoS requirement.

In a possible implementation of the present disclosure, the application layer information is provided by an AF in response to the QoS of the first video service transmission being incapable of being guaranteed.

In a possible implementation of the present disclosure, the label data includes at least one of ToS information, DSCP information, or traffic class information.

In a possible implementation of the present disclosure, the QoS flow with the first QoS guarantee is a GBR QoS flow, and the QoS flow with the second QoS guarantee is a non-GBR QoS flow.

It needs to be noted that, the apparatus for video transmission provided in embodiments of the present disclosure can implement all method steps achieved by method embodiments in FIG. 11, and can achieve the same technical effect, and the same parts in the method embodiments are not repeated in embodiments of the present disclosure.

It should be noted that, functional units in embodiments of the present disclosure may be integrated in a processing unit, or may be physically existed separately, or two or more units may be integrated in one unit. The above integrated unit may be implemented in the form of a hardware or in the form of a software functional unit.

The integrated unit may be stored in a processor readable storage medium when it is implemented in the form of a software function unit and sold and used as an independent product. On the basis of such an understanding, a part essentially contributing to the related art in the technical solution of the present disclosure, or all or part of the technical solution, may be embodied in the form of a software product. The computer software product is stored in a storage medium including several instructions so that a computer device (which may be a personal computer, a server or a network device) is caused to perform all or part of steps present each embodiment method of the present disclosure. The forgoing storage medium includes a USB disk, a mobile hard disk, a read-only memory (ROM), a random access memory (RAM), a magnetic disk or an optical disk and other media that may store program codes.

In order to implement the above embodiments, a processor-readable storage medium is further provided in the present disclosure.

The processor-readable storage medium with a computer program stored thereon is provided. The computer program is configured to cause a processor to perform the method for video transmission as described in embodiments of FIGS. 1 to 10 of the present disclosure.

The processor-readable storage medium may be any available medium or data storage device that the processor may access, including but not limited to a magnetic memory (e.g., a floppy disk, a hard disk, a magnetic tape, a magnetic optical disk (MO)) and an optical memory (e.g., a CD, a DVD, a BD, a HVD), and a semiconductor memory (e.g., a ROM, an EPROM, an EEPROM, a non-volatile memory (a NAND FLASH), a solid state drive (SSD)).

In order to implement the above embodiments, a processor-readable storage medium is further provided in the present disclosure.

The processor-readable storage medium with a computer program stored thereon is provided. The computer program is configured to cause a processor to perform the method for video transmission as described in the embodiment of FIG. 11 of the present disclosure.

The processor-readable storage medium may be any available medium or data storage device that the processor may access, including but not limited to a magnetic memory (e.g., a floppy disk, a hard disk, a magnetic tape, a magnetic optical disk (MO)) and an optical memory (e.g., a CD, a DVD, a BD, a HVD), and a semiconductor memory (e.g., a ROM, an EPROM, an EEPROM, a non-volatile memory (a NAND FLASH), a solid state drive (SSD)).

Embodiments in the present disclosure may be provided as methods, systems, or computer program products.

A computer program product including a computer program code is in further provided in embodiments of the present disclosure. The computer program code runs on a computer to perform the method for video transmission as described in embodiments of FIGS. 1 to 10.

A computer program product including a computer program code is in further provided in embodiments of the present disclosure. The computer program code runs on a computer to perform the method for video transmission as described in the embodiment of FIG. 11.

A communication apparatus including a processing circuit and an interface circuit is further provided in embodiments of the present disclosure. The interface circuit is configured to receive a computer code or instruction, and transmit the computer code or instruction to the processing circuit, and the processing circuit is configured to run the computer code or instruction, to perform the method for video transmission as described in embodiments of FIGS. 1 to 10.

A communication apparatus including a processing circuit and an interface circuit is in further provided in embodiments of the present disclosure. The interface circuit is configured to receive a computer code or instruction, and transmit the computer code or instruction to the processing circuit, and the processing circuit is configured to run the computer code or instruction, to perform the method for video transmission as described in the embodiment of FIG. 11.

A computer program including a computer program code is further provided in embodiments of the present disclosure. When the computer program code is running on a computer, the computer is caused to perform the method for video transmission as described in embodiments of FIGS. 1 to 10.

A computer program including a computer program code is further provided in embodiments of the present disclosure. When the computer program code is running on a computer, the computer is caused to perform the method for video transmission as described in the embodiment of FIG. 11.

Therefore, the present disclosure may adopt the form of a full hardware embodiment, a full software embodiment, or an embodiment combining a software and a hardware. Further, the present disclosure may adopt a form of a computer program product implemented on one or more computer usable storage media (including but not limited to a disk memory and an optical memory) including a computer usable program code.

The present disclosure is described with reference to flowcharts and/or block diagrams of methods, devices (systems), and computer program products according to embodiments of the present disclosure. It should be understood that each process and/or block in the flowchart and/or the block diagram, and a combination of the process and/or the box in the flowchart and/or the block diagram, may be implemented by computer-executable instructions. The computer-executable instructions may be provided to a processor of a general-purpose computer, a dedicated computer, an embedded processor, or other programmable data processing devices to produce a machine such that instructions executed by the processor of the computer or other programmable data processing devices may produce an apparatus for implementing functions specified in one or more processes of the flowchart and/or in one or more boxes of the block diagram.

The processor executable instructions may also be stored in a processor readable memory capable of guiding the computer or the other programmable data processing devices to operate in a particular manner such that the instructions stored in the processor readable memory produce an article of manufacture including an instruction apparatus that implements the function specified in one or more processes of the flowchart and/or in one or more boxes of the block diagram.

The processor executable instructions may also be loaded onto a computer or other programmable data processing devices such that a series of operation steps are performed on the computer or the other programmable devices to produce processings implemented by the computer such that the instructions executed on the computer or the other programmable devices provide steps of functions specified in one or more processes of the flowchart and/or in one or more boxes of the block diagram.

All embodiments of the present disclosure may be executed separately or in combination with other embodiments, and are deemed within a protection scope of the present disclosure.

What is claimed is:

1. A method for video transmission, applicable to a session management function (SMF), comprising:

receiving a policy and charging control (PCC) rule sent by a policy control function (PCF), wherein the PCC rule is generated by the PCF in response to determining that a transmission of a first video frame needs to be guaranteed, the PCC rule indicates that a quality of service (QoS) flow transmission with a first QoS guarantee is used for a first service flow, and the first service flow comprises a first video frame, and the PCC rule further indicates that a QoS flow transmission with a second QoS guarantee is used for a second service flow, the second service flow comprises a second video frame, generating packet detection information (PDI) based on the PCC rule; and sending the PDI to a user plane function (UPF) to enable the UPF to detect a first video frame and a second video frame in a downlink packet based on the PDI and label a corresponding QoS flow identifier (QFI) for the first video frame and the second video frame respectively, wherein the PDI comprises frame header type matching information corresponding to the first video frame and/or the second video frame respectively, or the PDI comprises label data corresponding to the first video frame and/or the second video frame respectively.

2. The method according to claim 1, wherein the first QoS guarantee is higher than the second QoS guarantee.

3. The method according to claim 1, wherein before receiving the PCC rule sent by the PCF, the method further comprises:

receiving a protocol data unit (PDU) session establishment request sent from a terminal device; and sending a first message to the PCF, wherein the first message is configured to, determine by the PCF, that a PDU session to be established is used for a transmission of a first video service, based on single network slice selection assistance information (S-NSSAI) and a data network name (DNN).

4. The method according to claim 1, wherein before receiving the PCC rule sent by the PCF, the method further comprises:

receiving a first notification message from an access network device, wherein the first notification message comprises indication information that a QoS of a first video service transmission is incapable of being guaranteed; and sending a second message to the PCF, wherein the second message comprises indication information that the access network device is incapable of guaranteeing the QoS of the first video service transmission.

5. The method according to claim 4, wherein the first notification message is generated by the access network device after releasing the QoS flow used by the first video service in response to determining that the QoS of the first video service transmission is incapable of being guaranteed, or generated by the access network device in response to determining that the QoS of the first video service transmission is incapable of being guaranteed and determining that the QoS flow adopted by the first video service enables a notification control mechanism without releasing the QoS flow.

6. The method according to claim 5, wherein the first video service comprises a video service determined based on a network policy or application layer information.

7. The method according to claim 6, wherein the application layer information comprises:

label data that is labeled for a video frame in a downlink packet and a corresponding QoS requirement.

8. The method according to claim 7, wherein the application layer information is provided by an application function (AF) in response to determining that the QoS of the first video service transmission is incapable of being guaranteed.

9. The method according to claim 8, wherein the label data comprises at least one of:

type of service (ToS) information;

differentiated services code point (DSCP) information; or traffic class information.

10. The method according to claim 8, wherein after receiving the PCC rule sent by the PCF, the method further comprises:

generating, based on the PCC rule, a QoS parameter of a QoS flow with the first QoS guarantee and a QoS parameter of a QoS flow with the second QoS guarantee; and initiating, based on the QoS parameter of the QoS flow with the first QoS guarantee and the QoS parameter of the QoS flow with the second QoS guarantee, a PDU session modification process, to establish the QoS flow with the first QoS guarantee for transmitting the first service flow, and to establish or modify the QoS flow with the second QoS guarantee for transmitting the second service flow.

11. The method according to claim 2, wherein the QoS flow with the first QoS guarantee is a guaranteed bit rate (GBR) QoS flow, and the QoS flow with the second QoS guarantee is a non-GBR QoS flow.

12. A method for video transmission, applicable to a policy control function (PCF), comprising:

in response to determining that a transmission of a first video frame needs to be guaranteed, generating a policy and charging control (PCC) rule, and sending the PCC rule to a session management function (SMF);

wherein the PCC rule indicates that a quality of service (QoS) flow transmission with a first QoS guarantee is used for a first service flow, and the first service flow comprises a first video frame, and the PCC rule further indicates that a QoS flow transmission with a second QoS guarantee is used for a second service flow, the second service flow comprises a second video frame, wherein the SMF generates packet detection information (PDI) based on the PCC rule; and the SMF sends the PDI to a user plane function (UPF) to enable the UPF to detect a first video frame and a second video frame in a downlink packet based on the PDI and label a corresponding QoS flow identifier (QFI) for the first video frame and the second video frame respectively, wherein the PDI comprises frame header type matching information corresponding to the first video frame and/or the second video frame respectively, or the PDI comprises label data corresponding to the first video frame and/or the second video frame respectively.

13. The method according to claim 12, wherein the first QoS guarantee is higher than the second QoS guarantee.

14. The method according to claim 12, wherein determining that the transmission of the first video frame needs to be guaranteed comprises:

determining that the transmission of the first video frame needs to be guaranteed in response to determining that a session a terminal device requests to establish is used for the transmission of the first video service.

15. The method according to claim 14, wherein determining that the session the terminal device requests to establish is used for the transmission of the first video service comprises:

receiving a first message sent by the SMF, wherein the first message is generated by the SMF in response to receiving a protocol data unit (PDU) session establishment request sent from the terminal device; and determining a PDU session to be established indicated by the first message is used for the transmission of the first video service, based on single network slice selection assistance information (S-NSSAI) and a data network name (DNN).

16. The method according to claim 13, wherein determining that the transmission of the first video frame needs to be guaranteed comprises:

determining that the transmission of the first video frame needs to be guaranteed in response to determining that an access network device is incapable of guaranteeing a QoS of a first video service transmission.

17. The method according to claim 16, further comprising:

determining that the access network device is incapable of guaranteeing the QoS of the first video service transmission based on a second message sent by the SMF, wherein the second message is generated by the SMF in response to receiving a first notification message from the access network device, and the first notification message comprises indication information that the QoS of the first video service transmission is incapable of being guaranteed.

18. A session management function (SMF), comprising
a memory, configured to store a computer program,
a processor, configured to read the computer program in the memory, and
a transceiver configured to transmit and receive data under a control of a processor,
wherein the processor is configured to perform an operation of:
    receiving a policy and charging control (PCC) rule sent by a policy control function (PCF), wherein the PCC rule is generated by the PCF in response to determining that a transmission of a first video frame needs to be guaranteed, the PCC rule indicates that a quality of service (QoS) flow transmission with a first QoS guarantee is used for a first service flow, and the first service flow comprises a first video frame, and the PCC rule further indicates that a QoS flow transmission with a second QoS guarantee is used for a second service flow, the second service flow comprises a second video frame,
generating packet detection information (PDI) based on the PCC rule; and
sending the PDI to a user plane function (UPF) to enable the UPF to detect a first video frame and a second video frame in a downlink packet based on the PDI and label a corresponding QoS flow identifier (QFI) for the first video frame and the second video frame respectively, wherein the PDI comprises frame header type matching information corresponding to the first video frame and/or the second video frame respectively, or the PDI comprises label data corresponding to the first video frame and/or the second video frame respectively.

\* \* \* \* \*